(12) United States Patent
Moghaddam et al.

(10) Patent No.: US 11,060,947 B2
(45) Date of Patent: Jul. 13, 2021

(54) TOP LOADED BIDIRECTIONAL TESTING SYSTEM AND METHOD OF USING THE SAME

(71) Applicants: GRL Engineers, Inc, Cleveland, OH (US); RBM Consulting Group, Inc., Converse, TX (US)

(72) Inventors: Rozbeh B. Moghaddam, San Antonio, TX (US); Frank Rausche, Chagrin Falls, OH (US); Patrick J. Hannigan, Chagrin Falls, OH (US)

(73) Assignees: GRL Engineers, Inc., Cleveland, OH (US); RBM Consulting Group, Inc., Converse, TX (US)

( * ) Notice: Subject to any disclaimer, the term of this patent is extended or adjusted under 35 U.S.C. 154(b) by 0 days.

(21) Appl. No.: 17/039,560

(22) Filed: Sep. 30, 2020

(65) Prior Publication Data
US 2021/0102863 A1 Apr. 8, 2021

Related U.S. Application Data

(60) Provisional application No. 62/909,601, filed on Oct. 2, 2019.

(51) Int. Cl.
*G01M 5/00* (2006.01)
*E02D 27/52* (2006.01)
*E02D 33/00* (2006.01)

(52) U.S. Cl.
CPC .......... *G01M 5/0058* (2013.01); *E02D 27/52* (2013.01); *E02D 33/00* (2013.01); *G01N 2203/0019* (2013.01)

(58) Field of Classification Search
CPC ........ E02D 33/00; E02D 1/022; E02D 27/52; E02D 5/56; G01M 5/0058; G01N 2203/0019
See application file for complete search history.

(56) References Cited

U.S. PATENT DOCUMENTS 3,732,725 A * 5/1973 Allen, Jr. ................. G01N 3/48
                                                              73/81
4,081,992 A * 4/1978 Aurora ................ G01M 99/007
                                                              73/84

(Continued)

FOREIGN PATENT DOCUMENTS

AU     719665 B2    5/2000
CS     216409 B1    1/1985

OTHER PUBLICATIONS

International Search Report for corresponding PCT/US20/53607 dated Dec. 30, 2020, 8 pgs.

*Primary Examiner* — Max H Noori
(74) *Attorney, Agent, or Firm* — Rankin, Hill & Clark LLP

(57) ABSTRACT

A testing system for load test measuring a shaft resistance and a base resistance having first and second operating units with the first operating unit having a bottom loading plate, a base bearing plate and base mobilizer bars operably joined thereto; the second operating unit having a top loading plate, a shaft bearing plate and shaft mobilizer bars operably joining them together wherein the first and second operating units can move relative to one another; the system having a loading sources producing a test load between the top and bottom loading plates to move them apart wherein the shaft bearing plate that is positioned below a foundation element produces an upward compressive force test load on the foundation element to test shaft resistance and the base bearing plate that is positioned between the shaft bearing plate and the bottom surface of the foundation opening produces a downward compressive force test load on the bottom surface to test base resistance.

26 Claims, 15 Drawing Sheets

(56) References Cited

U.S. PATENT DOCUMENTS

| | | | | |
|---|---|---|---|---|
| 4,529,567 A | * | 7/1985 | Richard | B28B 3/00 |
| | | | | 264/228 |
| 4,614,110 A | * | 9/1986 | Osterberg | E02D 33/00 |
| | | | | 73/784 |
| 5,282,701 A | | 2/1994 | An et al. | |
| 5,576,494 A | | 11/1996 | Osterberg | |
| 5,677,495 A | * | 10/1997 | Johnson | G01N 3/02 |
| | | | | 73/818 |
| 6,363,776 B1 | * | 4/2002 | Reinert, Sr. | E02D 33/00 |
| | | | | 73/819 |
| 8,926,227 B2 | | 1/2015 | Zago et al. | |
| 9,689,136 B2 | | 6/2017 | Dinh et al. | |
| 10,822,761 B1 | * | 11/2020 | Voyen | E04G 25/04 |
| 10,823,880 B1 | * | 11/2020 | Gupta | E02D 33/00 |
| 2006/0213279 A1 | * | 9/2006 | Choi | E02D 33/00 |
| | | | | 73/786 |
| 2012/0308309 A1 | * | 12/2012 | Del Campo y Ruiz de Almondovar | E02D 27/52 |
| | | | | 405/233 |
| 2013/0086974 A1 | * | 4/2013 | Rausche | G01N 3/303 |
| | | | | 73/12.01 |
| 2021/0088498 A1 | * | 3/2021 | Dubs | G01N 33/24 |

\* cited by examiner

TOP LOADED BIDIRECTIONAL TESTING SYSTEM AND METHOD OF USING THE SAME

This application claims priority to provisional patent application Ser. No. 62/909,601 filed on Oct. 2, 2019, which is incorporated by reference herein.

The invention of this application relates to a load application apparatus and method that can perform a full-scale load test to measure both base resistance and shaft resistance of any structural and non-structural element classified as a deep foundation including but not limited to driven piles, drilled shafts, displacement piles, continuous flight auger piles, auger cast in place piles, or classified as any load transferring element including but not limited to vibro replacement columns, vibro concrete columns, controlled modulus columns, and rigid inclusions hereinafter collectively referred to as "foundation(s)". Furthermore, the invention in this application relates to an embedded apparatus and method of determining base and shaft resistance independently through a full-scale load test without the need to embed a jack assembly within the foundation or construct any type of reaction system built at the top of the foundation.

BACKGROUND OF THE INVENTION

Load testing systems and apparatuses have been used in the construction industry for a number of years. These systems and apparatuses include a wide range of devices and monitoring instrumentation used for variety of reasons. This includes devices that are used in connection with the load testing of supporting structures such as foundations that are used to support the weight of superstructures including but not limited to bridges, industrial structures, commercial buildings, retaining walls and embankments. As can be appreciated, it is important to assess that a supporting structure, such as a foundation, has been properly designed and installed to perform as required during its service life.

Primarily, foundation static load testing can be classified into three types of testing: (1) Conventional Top-Down Static Load Test ("TDSLT"), (2) Bi-Directional Static Load Test ("BDSLT"), and (3) non-conventional Static Load Test

Conventional Top-Down Static Load Test ("TDSLT")

In the TDSLT arrangement, axial compression loads are applied to the foundation from the top where the loading apparatus reacts against a reaction system built at the top of the foundation. The most common reaction system used in a TDSLT is beam-based reaction system consisting of a main reaction beam supported by secondary or junior beams. Although TDSLT is a suitable test for foundation, limitations on the structural capacity of the reaction system limits the use of the test. Other noticeable limitations are the difficulty of transferring loads to deeper depths and a potentially highly dangerous work environment when high reaction loads are in use. Considering modern foundation types and elements and their significantly increased diameter and length, the TDSLT arrangement becomes insufficient for testing a foundation for higher loads.

Bi-Directional Static Load Test ("BDSLT")

The BDSLT is performed by applying loads to the foundation in two directions using an embedded jack assembly comprised of one or more expandable hydraulic jack(s) placed between an upper and lower plate and cast within the foundation. Originally, the BDSLT was known in the art as the Osterberg test because of the use of a specially designed loading device called the Osterberg cell ("O-Cell") as presented by Osterberg J. O. in the U.S. Pat. No. 5,576,494 to Osterberg, which is incorporated by reference into this application. During the O-Cell test, pressure is applied to the O-Cell, which theroatically creates an equal upward and downward force inside the foundation. This test makes it possible to evaluate the foundation base resistance and the foundation shaft resistance separately. The main advantage of the BDSLT using the O-Cell test is that it makes it possible to test the foundation with half of the jack load compared to a TDSLT.

The BDSLT has the advantage of providing higher loads and the ability of safely testing larger diameter foundations since loads are applied internally from within. However, like any other test, the BDSLT also presents some limitations. One of the limitations is the cost associated with the one-time-use sacrificial hydraulic jack. Since the jack assembly becomes part of the foundation, the jack assembly is sacrificial and unrecoverable which significantly impacts the test cost.

Another limitation to consider is the test setup workability. Since hydraulic lines and the jack assembly are all embedded within the foundation, any slight damage to the lines or the Jack assembly itself during the construction process could significantly impact the load test. Finally, for foundations with potentially large displacement requirements at the base, the installed jack may not have enough stroke to reach the required resistance.

Non-Conventional Static Load Test

A non-conventional static load test method primarily applicable to bored piles was first presented by Cernak (1985) in patent CS216409, proposing the separation between the base and shaft resistance using a reaction system built at the top and within the bored pile. The proposed mechanism consisted of the anchored frame pulling the bored pile upwards (such as in a tension test) by reacting against the bored pile base throughout a center strut. The major and most significant limitation of this test is the reduction of the ratio of lateral strain over linear strain also known as the Poisson's ratio. As the bored pile is pulled upwards, a reduction in the diameter is created for which the shaft resistance is not comparable to scenarios where axial compression loads are applied to the bored pile. Additionally, even in the presence of sufficient upward soil resistance, the foundation may not have the necessary structural strength to counteract the required base load. The Cernak Patent No. CS216409 is hereby incorporated by reference into this application.

Another non-conventional load testing method with specific application to driven piles was patented by Kyung-Han An et al. (1994), U.S. Pat. No. 5,282,701, describing a self-repulsive force applied to the driven pile to measure base and shaft resistances in two separate testing stages. The test is performed by driving a hollow steel pile with a cone-shaped end member abutted to the lower-end of the test pile. Loads are applied from the top of the foundation to the cone-shaped end member through a load-transferring pipe while pulling the exterior pipe out of the ground. The Kyung-Han An U.S. Pat. No. 5,282,701 is hereby incorporated by reference into this application.

All of the documents and materials referenced above are hereby incorporated by reference into this application in their entirety.

SUMMARY OF THE INVENTION

Applicant has developed its own load testing apparatus and method for testing the geomaterial resistance surrounding and underlaying the foundation that overcomes the many shortcomings in the prior art systems. This system is incorporated by reference into this specification wherein details on Applicant's Top Loaded Bidirectional Test ("TLBT") apparatus and method are shown in the drawings attached hereto. The invention relates to a test where loads are transferred to the foundation using two stacked steel plates within the foundation. Depending on the magnitude of the geotechnical resistance, the plates maybe located at the foundation base or higher up in the foundation. The lower steel plate transfers the load to the base or a lower foundation portion, while the upper steel plate pushes an upper foundation portion upwards. In this test method, all loading sources are located at the top of the foundation without the need of beam-based reactions or any other constructed reaction system. Furthermore, loads are transferred to the testing apparatus presented in this invention, which will apply bidirectional loads to the foundation without the need of embedded jacks. Therefore, the risk of damaged or inoperable hydraulic lines and hydraulic jacks during the construction process is eliminated. Moreover, the risk of hydraulic fluid spills within the subsurface strata is eliminated. In addition, the apparatus related to this invention, creates a compressive force applied to the foundation which provides advantage over other testing systems where the foundation is pulled upward (similar to a tension test) creating a reduction in the Poisson's ratio which consequently does not properly determine the shaft resistance. Also, the test can be applied to a foundation with limited tensile strength. Another advantage is that the spread between the two loading plates can easily be adjusted when the soil underneath or along the sides of the foundation requires a large displacement to reach the test load. Furthermore, the unlimited displacement capability of the application related to this invention, allows for virtually unlimited additional loading cycles even after grouting the space or void between the two stacked plates.

In greater detail, the invention of this application relates to an embedded load application apparatus and method that can perform a full-scale load test measuring the shaft resistance and base resistance without embedding a jack assembly within the foundation. Furthermore, the invention of this application relates to an embedded load application apparatus and method for determining the foundation shaft resistance and base resistance without the use of any beam-based reaction system or any other constructed reaction system at the foundation top. Moreover, the system of this application tests the foundation by way of compressive forces and not tensile forces, and has unlimited displacement capabilities.

More particularly, the testing apparatus of this invention includes an expandable jack or loading source ("Jack") located at the foundation top with one or more top loading plate(s) or assemblies (hereinafter collectively referred to as top plate(s)), one or more bottom loading plate(s) or assemblies (hereinafter collectively referred to as bottom plate(s)), one or more base mobilizer bar(s), one or more shaft mobilizer bar(s), one or more shaft bearing plate(s), and one or more base bearing plate(s). The shaft mobilizer bar(s) are connected to the top plate(s) above the Jack, passing through the bottom plate(s), and connected to the shaft bearing plate(s). The base mobilizer bar(s) are connected to the bottom plate(s) passing through the shaft bearing plate(s) and then connected to the base bearing plate(s). To provide free movement during the test, all shaft mobilizer bar(s) and/or base mobilizer bar(s) can be installed as an insertion through sacrificial tubes.

The testing apparatus of this invention is divided into two segments. Segment two is installed first within the foundation in the preferred embodiment and includes the shaft mobilizer bar(s), base mobilizer bar(s), shaft bearing plate(s), base bearing plate(s), and their surrounding sacrificial tubes. The shaft mobilizer bar(s) and base mobilizer bar(s) are inserted inside these sacrificial tubes before or after foundation installation. The shaft mobilizer bar(s) are screwed or pushed-in into the shaft bearing plate(s) and the base mobilizer bar(s) rest on the base bearing plate(s). The shaft mobilizer bar(s) and base mobilizer bar(s) can be removed from segment two after the test, making them reusable. Alternatively, shaft mobilizer bar(s) and base mobilizer bar(s) can be left in-place for additional structural reinforcement. Also the bars could be post-tensioned for additional structural (bending) strength of the foundation element.

Segment one is connected to segment two after the foundation is installed. Segment one includes the reusable Jack, top loading plate(s), and the bottom loading plate(s).

The testing description of this invention is defined as follows: as the Jack is pressurized, it pushes upwards reacting against the top loading plate(s). The jack load is directly transferred to the base bearing plate(s) by way of the bottom loading plate(s) and base mobilizer bar(s). The shaft mobilizer bar(s) are pulled upwards as the Jack is loading and reacting against the top loading plate(s). This consequently pulls the shaft bearing plate(s) upward resulting in upward compression forces applied to the foundation. Measurements associated with the base bearing plate(s) displacements and applied loads will define the foundation base resistance, whereas, measurements associated with the shaft bearing plate(s) displacements and applied loads will define the foundation shaft resistance. Strain measurements using strain gages on the shaft mobilizer bar(s) and/or the base mobilizer bar(s) provide a check of internal bar forces and jack loads. Moreover, and particularly, loads transferred to the shaft bearing plate(s), by way of the shaft mobilizer bar(s), can alternatively or additionally be monitored using load cells located between the shaft bearing plate(s) and the shaft mobilizer bar(s). Furthermore, Loads transferred to the base bearing plate(s), by way of the base mobilizer bar(s), can alternatively or additionally be monitored using load cells located between the base bearing plate(s) and the base mobilizer bar(s).

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
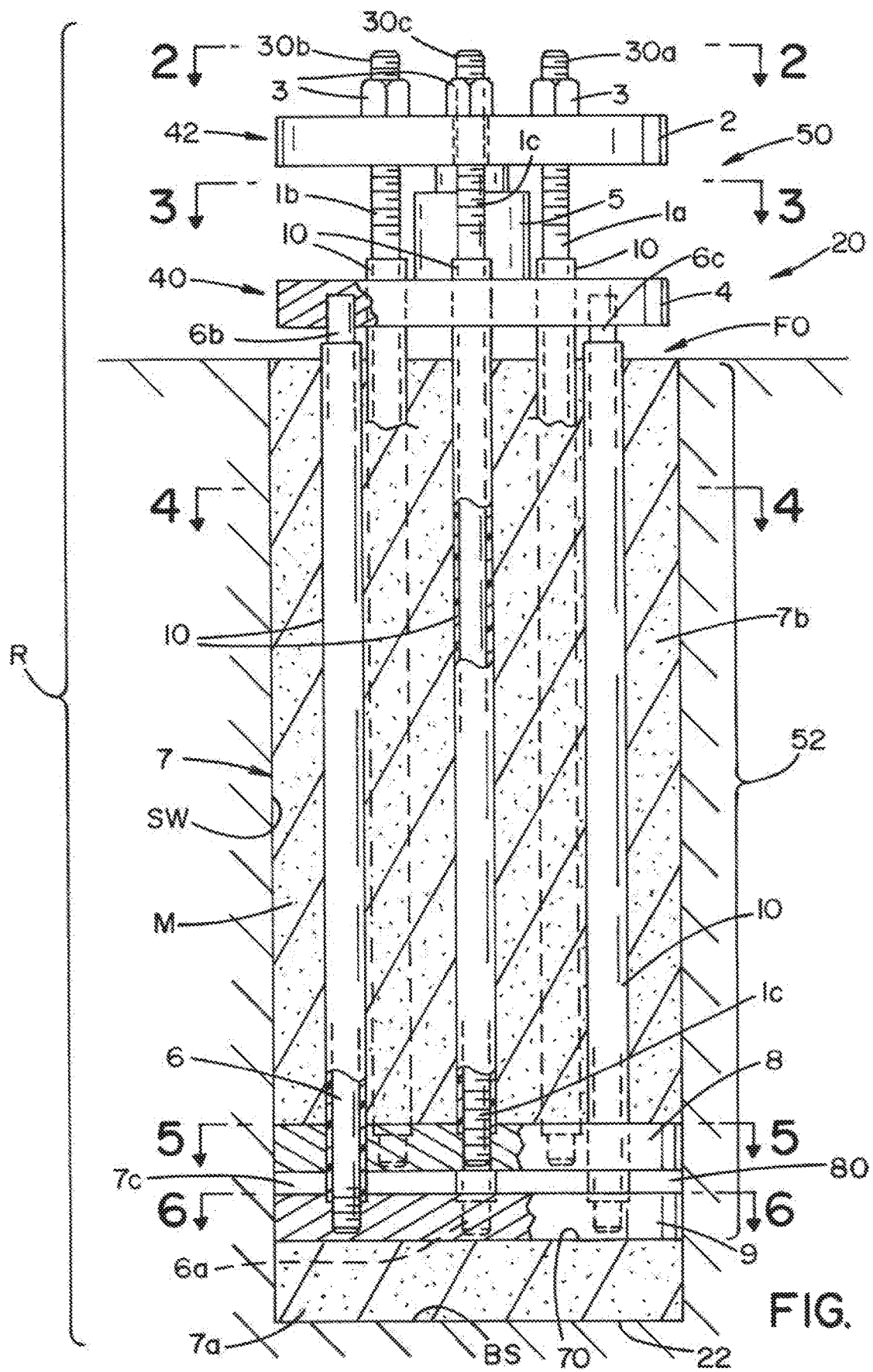
FIG. 1 is a partially sectioned elevational view of a testing arrangement and apparatus according to the certain aspects of the present invention.
Figure 2:
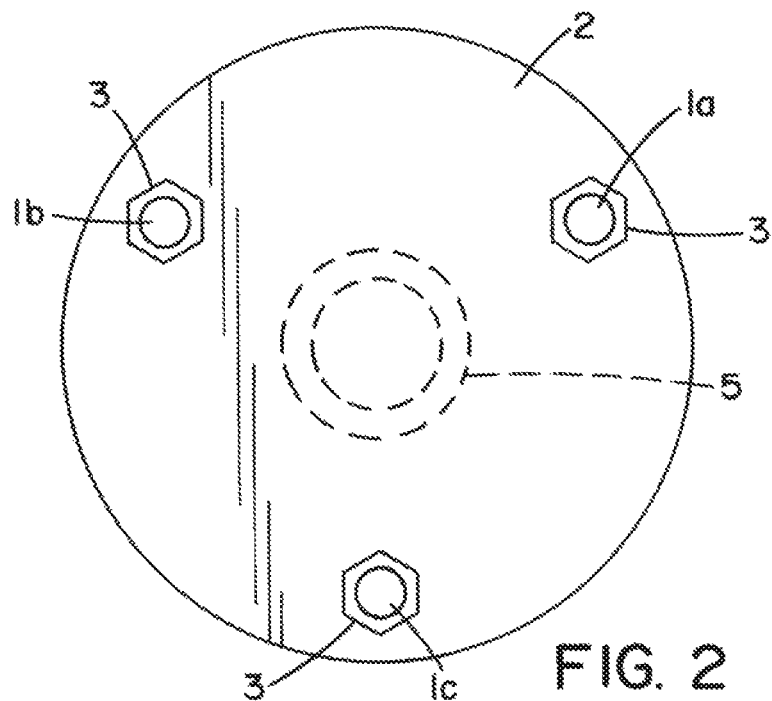
FIG. 2 is a plan view taken along line 2-2 in FIG. 1.
Figure 3:
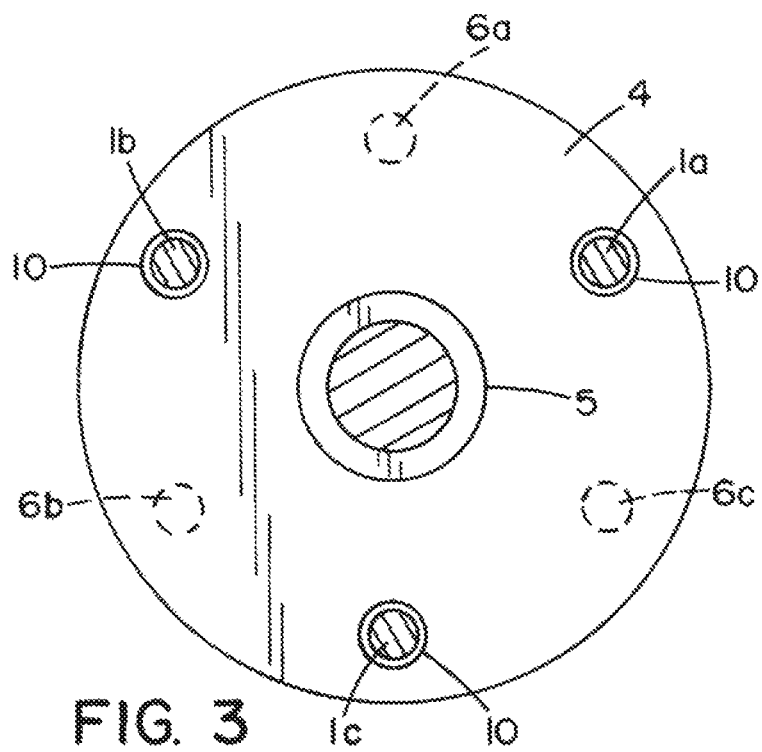
FIG. 3 is a sectional view taken along line 3-3 in FIG. 1.
Figure 4:
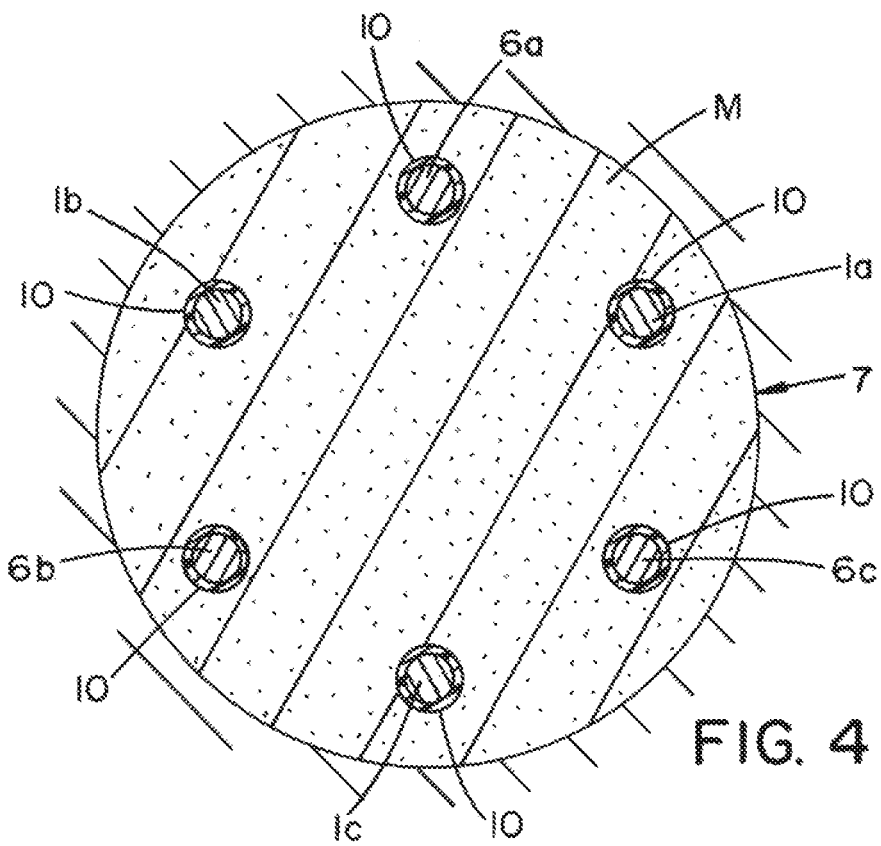
FIG. 4 is a sectional view taken along line 4-4 in FIG. 1.
Figure 5:
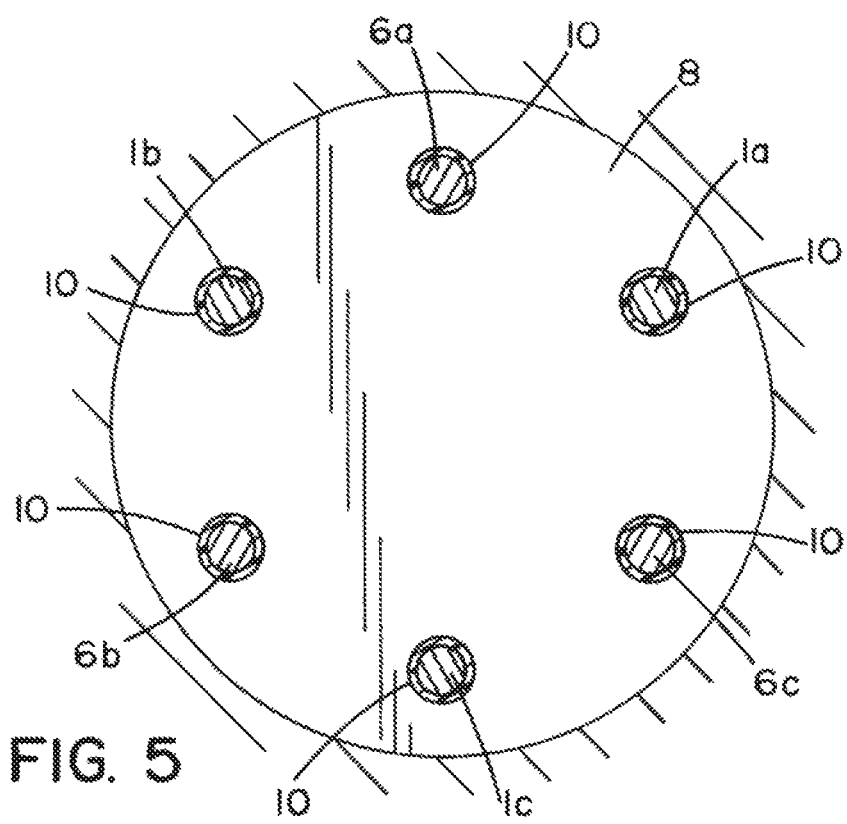
FIG. 5 is a sectional view taken along line 5-5 in FIG. 1.
Figure 6:
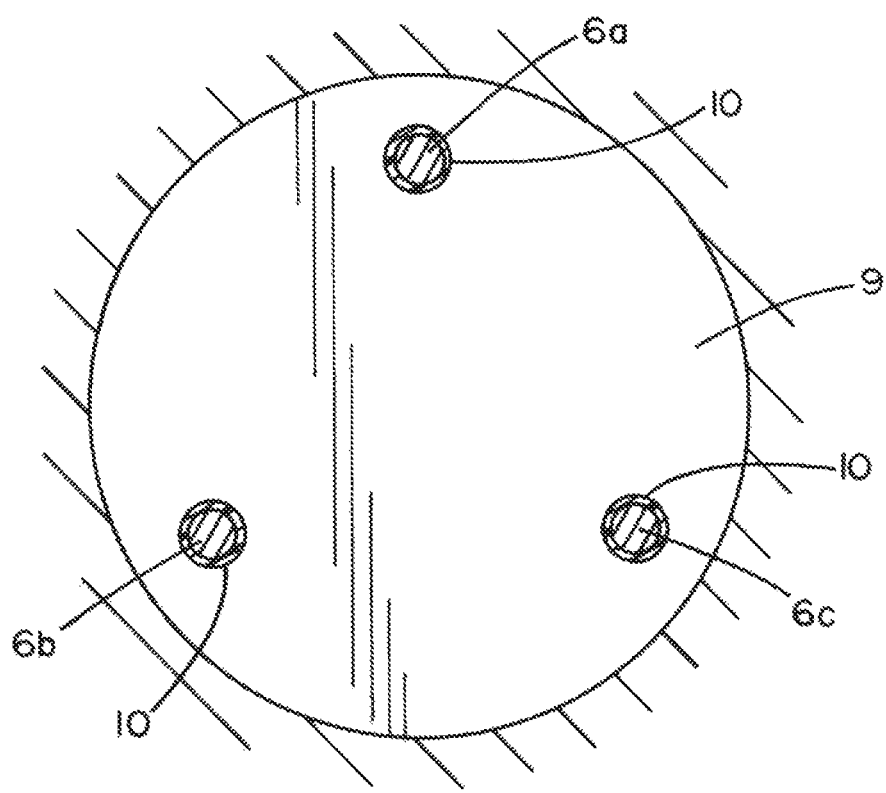
FIG. 6 is a sectional view taken along line 6-6 in FIG. 1.
Figure 7:
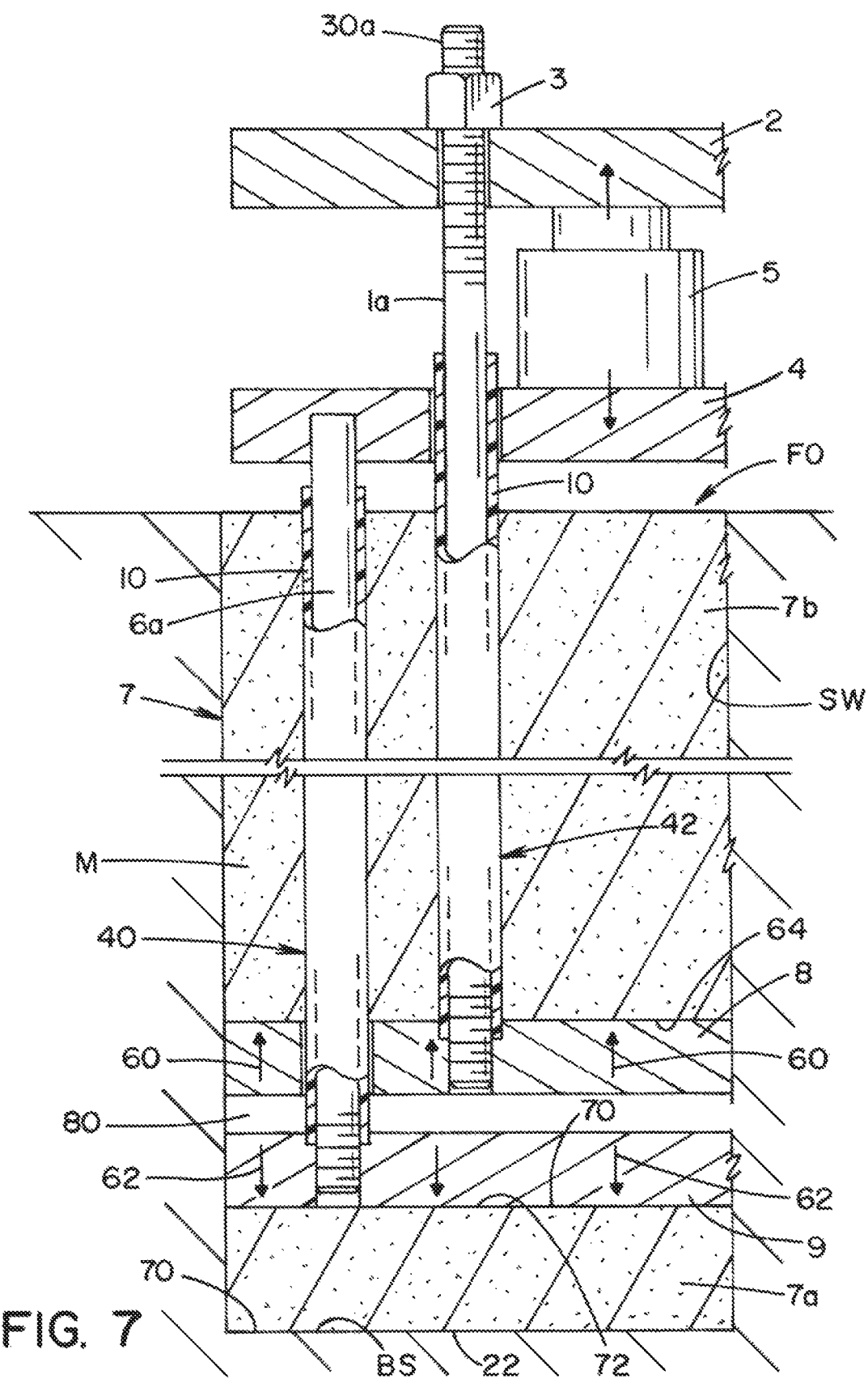
FIG. 7 is an enlarged sectional view of the load testing apparatus shown in FIG. 1.
Figure 8:
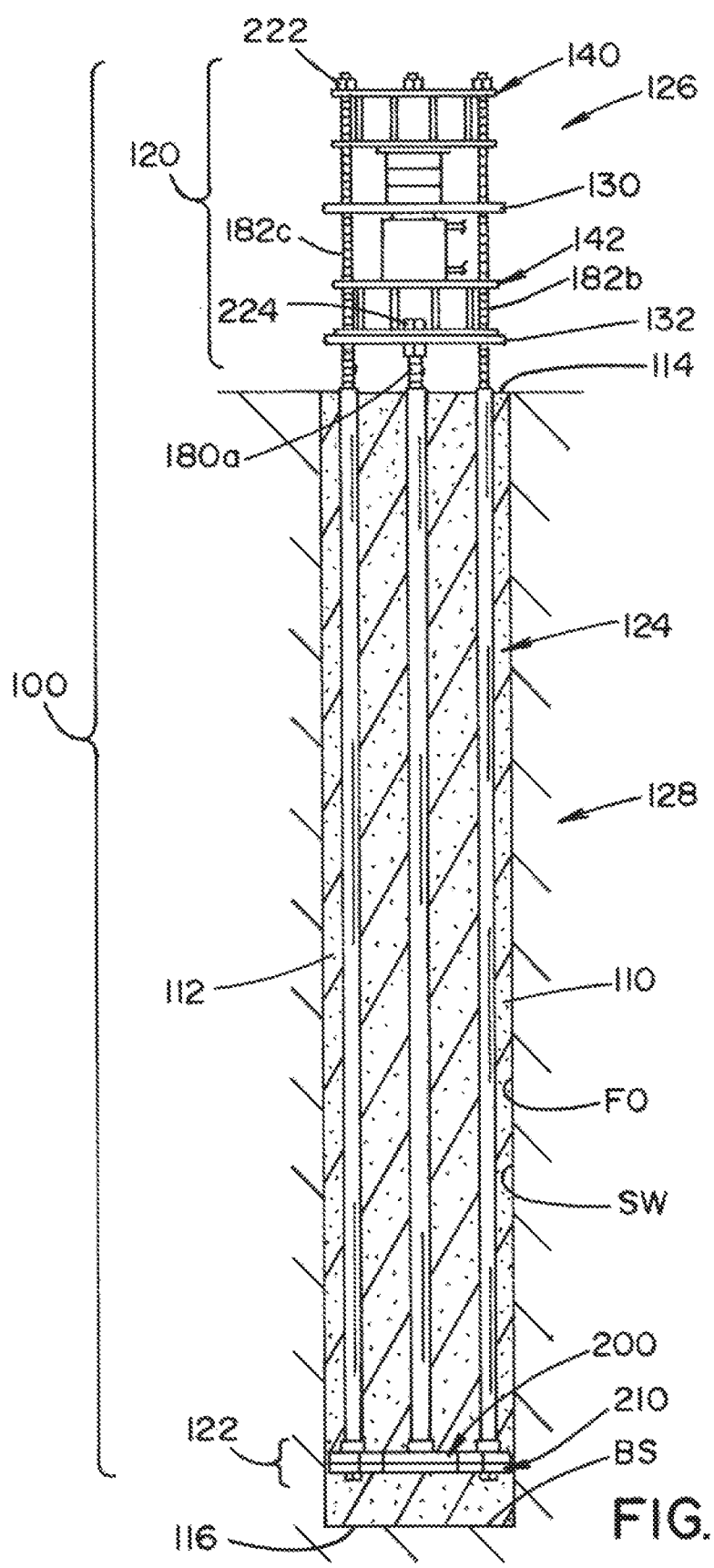
FIG. 8 is an elevational view of another set of embodiments showing another testing arrangement and apparatus according to the certain other aspects of the present invention.
Figure 9:
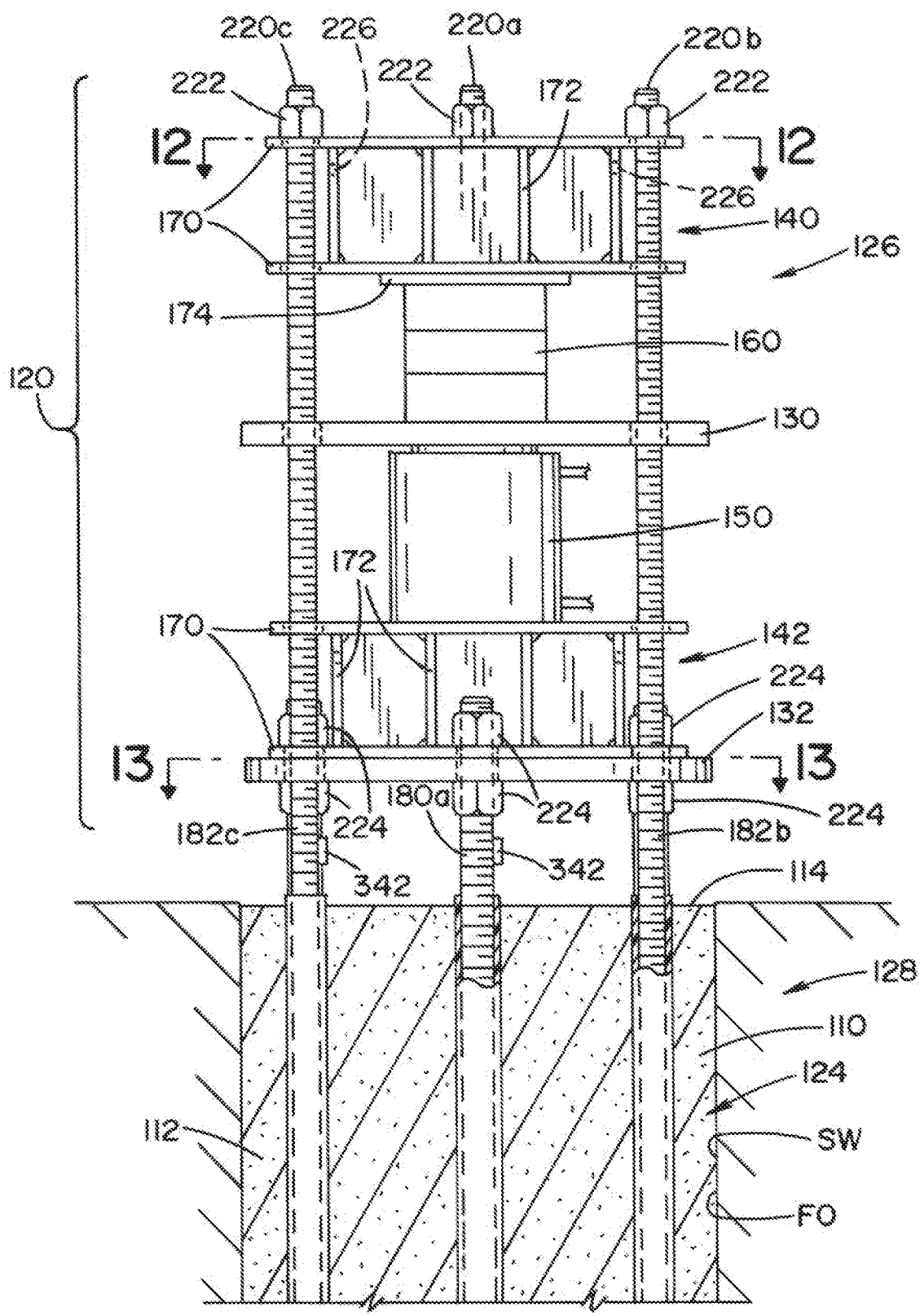
FIG. 9 is an elevational view showing a top portion of the testing arrangement and apparatus shown in FIG. 8.

Referring now to the drawings wherein the showings are for the purpose of illustrating preferred and alternative embodiments of the invention only and not for the purpose of limiting the same, FIGS. 1-7 show a Top Loaded Bidirectional Test system R that includes, but is not limited to the following primary components:

| Number | Description |
| --- | --- |
| 1 | SMB- Shaft Mobilizer Bar(s) |
| 2 | TLP- Top Loading Plate(s) |
| 3 | SMB- TLP Connection(s) |
| 4 | BLP- Bottom Loading Plate |
| 5 | Loading Source(s) |
| 6 | BMB- Base Mobilizer Bar(s) |
| 7 | Foundation Element |
| 8 | SBP- Shaft Bearing Plate (s) |
| 9 | BBP- Base Bearing Plate(s) |
| 10 | ST- Sacrificial Tube(s) |

In greater detail, system R can perform a full-scale load test measuring the shaft resistance and base resistance without embedding a jack assembly within a foundation element 7. System R relates to an embedded load application apparatus and method for determining the foundation element's shaft resistance and base resistance without the use of any embedded hydraulic jack or beam-based reaction system or any other constructed reaction system at a foundation top extent 20.

In greater detail, foundation element 7 extends into a foundation opening FO wherein foundation opening FO includes one or more sidewalls SW and a bottom surface BS. Foundation element FO can include one or more foundational structures 7a-c and overall extends between foundation top extent 20 and a foundation bottom extent 22, which will be discuss more below. As is shown in the figures as an example, foundation element 7 can include a first foundation element 7a and a second foundation element 7b, but this is not required, and more than two foundation elements could be utilized without detracting from the invention of this application. For example, the foundation element can include a foundation element 7c between shaft bearing plate 8 and base bearing plate 9.

System R includes one or more expandable jacks or loading sources 5, which can be any type of load source known in the art. Loading source 5 is located at or near foundation top extent 20 with at least one top loading plate 2 positioned above loading source 5. The system further includes at least one bottom loading plate 4 positioned below loading source 5. Plates 2 and 4 can have a wide range of configurations without detracting from the invention of this application wherein the figures are not to be interpreted to limit the invention. In the embodiment shown, system R further includes at least one base mobilizer bar 6 and at least one shaft mobilizer bar 1. System R further includes at least one shaft bearing plate 8 and at least one base bearing plate 9. While plates 8 and 9 are shown to have a circular configuration, these plates can include a wide range of configuration and/or construction formats without detracting from the invention of this application. As will be discussed more below, plates 2, 4, 8 and/or 9 can also include a wide range of features and/or configurations without detracting from the invention of this application. For example, plates 8 and/or 9 can include a central opening that can be configured and sized to allow a tremie pipe, which is used to fill foundation opening FO with material, to pass by the plate(s). Moreover, plates 8 and/or 9 can include other openings and/or edge cutouts that can allow the foundation material to more freely pass by and around the plate(s) to fully engulf the plate(s) in foundation opening FO with material. As will also be discussed more below, the openings and/or cutouts also can be used for the attachment and/or use of sensors for any purpose including, but not limited to, monitoring the testing activities, monitor forces, monitor displacement and/or monitoring the curing of the foundation material. Moreover, they can be used to allow the system to work with other structural materials and systems such as structural rebar.

As is shown in the illustrated embodiments in these figures, system R can include three shaft mobilizer bars 1a-1c and three base mobilizer bars 6a-6c, but the invention of this application is not limited to the illustrated three bar configurations nor is it limited to the exact locations of the bars in the plates that are shown in the figures. Moreover, larger foundational elements could include more bars and smaller foundation elements could include less bars.

Shaft mobilizer bars 1a-1c are joined between top loading plate 2 that is above source or jack 5 and shaft bearing plate 8 wherein shaft mobilizer bars 1a-1c have shaft bar top ends 30a-30c that are fixed relative to top loading plate 2 by any means known in the art. As is shown, connectors 3 can be used to secure top ends 30a-30c on the opposite side of plate 2 as source 5. Connectors 3 can be any type of fastening device or system including, but not limited to, nuts, other types of threaded fasteners, locking pins, press fitted fittings, and/or welded arrangements. Shaft mobilizing bars 1a-1c are also fixed relative to shaft bearing plate 8. Again, as can be appreciated, any method of attaching the bars relative to the plates can be used without detracting from the invention of this application. Shaft mobilizer bars 1a-1c are configured to pass through bottom loading plate 4 thereby allowing bars 1a-1c to connect top loading plate 2 to shaft bearing plate 8 and move relative to bottom loading plate 4.

Base mobilizing bars 6a-6c are joined between bottom loading plate 4 and base bearing plate 9. Again, base mobilizing bars are operably fixed relative to these plates and can be secured thereto by any means known in the art including, but not limited to, fasteners, press fitting, threading, and/or welding. However, in that base mobilizing bars 6a-6c only push against the base mobilizing bars and the bottom loading plate, they do not need to be fastened thereto. Base mobilizing bars 6a-6c are configured to pass through shaft bearing plate 8 thereby allowing bars 6a-6c to connect bottom loading plate 4 to base bearing plate 9 and to move relative to shaft bearing plate 8.

In that base mobilizing bars 6a-6c are configured to pass through shaft bearing plate 8; base mobilizer bars 6a-6c, bottom loading plate 4, and base bearing plate 9 operate as a first operating unit 40. Similarly, in that shaft mobilizer bars 1a-1c are configured to pass through bottom loading plate 4; shaft mobilizing bars 1a-1c, top loading plate 2, and shaft bearing plate 8 operate as a second operating unit 42 that is configured to move relative to first operating unit 40.

To improve the freedom of movement in operating units 40 and 42, shaft mobilizer bars 1a-1c can be inserted through sacrificial tubes 10 and/or base mobilizing bars 6a-6c can be inserted through sacrificial tubes 10. Any type of sacrificial tubes and/or bars can be used without detracting from the invention of this application, which includes, but is not limited to PVC tubing. Moreover, sacrificial tubes 10 can be secured relative to shaft bearing plate 8 and/or base bearing plate 9, respectively, wherein the sacrificial tubes can be used to lower shaft bearing plate 8 and/or base bearing plate 9 into the foundation opening as the system is being operably assembled within the foundation opening. As a result, base mobilizing bars 6a-6c can be operably joined to base bearing plate 9 of first operating unit 40 by merely resting against base bearing plate 9. This allows mobilizing bars 6a-6c to be easily removed after testing.

The testing apparatus of this invention also can be divided into a first segment 50 and a second segment 52. First segment 50 can include the major components that are outside of the foundation element during testing. In this respect, first segment 50 can include, but is not limited to, one or more sources or jacks 5, top loading plate 2 and bottom loading plate 4. In that the components of first segment 50 are outside of the foundation element, they are reusable. Second segment 52 can include the major components that are inside of the foundation element during testing. In this respect, second segment 52 can include, but is not limited to, shaft mobilizing bars 1a-1c, base mobilizing bars 6a-6c, shaft bearing plate 8 and base bearing plate 9. Moreover, second segment 52 can include sacrificial tubes 10 if they are used in the system.

In one set of embodiments, second segment 52 can be installed first within the foundation opening. The bars can be inserted inside the sacrificial tubes before and/or after foundation installation. Shaft mobilizing bars 1a-1c are secured relative to shaft bearing plate 8 by any method known in the art that includes, but is not limited to, threading the bars into a threaded openings in the shaft bearing plate, press fitting the bars into the plate, welding the bars to the plate and/or using fasteners to secure the bars to the plate wherein the fasteners can be fastened to the plate by any means known in the art including welding fasteners to the plate. Moreover, the "bars" referenced in this application can be any structural object or objects that can transfer the needed forces between the plates. Base mobilizing bars 6a-6c can be configured to rest on base bearing plate 9. Moreover, according to certain embodiments, shaft mobilizing bars 1a-1c and/or base mobilizing bars 6a-6c can be configured to be removable from second segment 52 after the test, which makes them also reusable. In other embodiments, shaft mobilizing bars 1a-1c and/or base mobilizing bars 6a-6c can be configured to be left in-place.

First segment 50 can be connected to second segment 52 after the foundation is installed. In that the components of first segment 50 are outside of the foundation element, they are also reusable.

An example testing description and/or method of this application is as follows:

Second segment 52 is positioned in the foundation opening wherein second segment 52 can be assembled at the jobsite and/or can be assembled, at least in part, as the second segment is positioned in the foundation opening;

Any number of sensor arrangements can be positioned on and/or around second segment 52 to measure forces, displacement, stress, strain and/or any other operational factors associated with the test. In that sensors and sensor arrangements for measuring these kinds of data are known in the industry, these are not disclosed in detail herein in the interest of brevity;

Material M is poured into the foundation opening to form foundation element 7 (or 7b) and is allowed to cure;

In at least one set of embodiments where the base bearing plate 9 is not directly located at the foundation base and it is not in direct contact with the geomaterial or bottom surface BO at the foundation base, a portion of the foundation opening can be filled with material M and/or any other suitable material before second segment 52 is position in the foundation opening to produce a lower foundation element 7a as is shown in the illustrated embodiments. Base bearing plate 9 then rests on the top of lower foundation element 7a;

First segment 50 is joined relative to second segment 52 and above foundation element 7;

Loading source 5 is pressurized wherein source 5 pushes downwardly against bottom loading plate 4 and first operating unit 40 that includes, base mobilizing bars 6a-6c, bottom loading plate 4 and base bearing plate 9;

Similarly, pressurizing loading source 5 pushes upwardly against top loading plate 2 and second operating unit 42 that includes, shaft mobilizing bars 1a-1c, top loading plate 2, and shaft bearing plate 8.

The load from loading source 5 is directly transferred to base bearing plate 9 by way of bottom loading plate 4 and base mobilizer bars 6a-6c;

Shaft mobilizing bars 1a-1c are pulled upwards as source 5 is loaded and reacts against top loading plate 2. This consequently pulls shaft bearing plate 8 upwardly resulting in an upward compression forces 60 that are applied to a bottom surface 64 of foundation Element 7 (or 7b). This also pushes base bearing plate downwardly in a downward compression force 62 that is applied to a bottom surface 70. Again, bottom surface 70 can be any bottom surface including a bottom extent of the foundation opening BS and/or a top extent 72 of lower foundation element 7a as is shown in the illustrated embodiments.

Measurements associated with the test can be taken during and/or after the test.

These measurements can include, but are not limited to, measuring the displacement of base bearing plate 9 and applied loads of base bearing plate 9, which will define the foundation base resistance. This can also include taking measurements associated with shaft bearing plate 8 wherein displacements and applied loads will define the foundation shaft resistance. Strain measurements using strain gages on shaft bearing plate 8 and/or shaft base plate 9 can provide a check of internal bar forces and source 5 loads. Moreover, loads transferred to shaft bearing plate 8 by means of the shaft mobilizer bar 1a-1c can alternatively or additionally be monitored using load cells located between the shaft base plate and the shaft mobilizing bar(s). Yet even further, loads transferred to base bearing plate 9 by means of base mobilizer bar can alternatively and/or additionally be monitored using load cells located between the base bearing plate and the based mobilizing bar(s). All of which is accomplished while foundation elements 7 and 7a are fully in compression.

According to yet other embodiments, the foundation element can also be used as a structural load bearing member after the test. In this set of embodiments, once the test(s) are completed, shaft mobilizing bars 1a-1c and base mobilizing bars 6a-6c can be removed and sacrificial tubes 10 can be filled with material, such as the grout used for the foundation element. Moreover, sacrificial tubes can be used as one or more flow paths to fill void 80 that is between base bearing plate 9 and shaft bearing plate 8. In one set of embodiments, the flow path(s) can be formed from the sacrificial tubes that rest against base bearing plate 9. High pressure filling techniques can be used to fill these opening to ensure the usability of the structural member. Additionally or alternatively, the shaft mobilizer bars 6a-6c can be used as inlets for the injection of any suitable material including, but not limited to, grout used for the foundation element. Alternatively, shaft mobilizer bar(s) and base mobilizer bar(s) can be left in-place for additional structural reinforcement. Depending upon the base mobilizing bars to base bearing plate connection, post-test foundation reuse under tension and bending loads is possible. Also the bars could be post-tensioned for additional structural (bending) strength of the foundation element.

FIGS. 8-17 show a Top Loaded Bidirectional Test system 100 that shows yet other aspects of the present invention. As with system R, system 100 can perform a full-scale load test measuring the shaft resistance and base resistance without embedding a jack assembly within the foundation element. Moreover, system 100 can perform the methods described above wherein this description will not be repeated in the interest of brevity.

Again, the foundation element can be any foundation element and can have a wide range of dimension without detracting from the invention of this application. This set of embodiments show a foundation element 110 that extends into a foundation opening FO wherein foundation opening FO includes one or more sidewalls SW and a bottom surface BS. Foundation element FO can include one or more foundational structures or elements 112 as is described above wherein overall the one or more foundation structures extends between foundation top extent 114 and a foundation bottom extent 116.

System 100 includes a top portion 120 and a bottom portion 122 with one or more bars or rods 124 extending therebetween, which will be discussed more below. Top portion 120 can form a first segment 126 and bottom portion 122 and/or rods 124 can form a second segment 128. Top portion 120 and/or first segment 126 can include the major components that are outside of the foundation element during testing while bottom portion 122, rods 124 and/or second segment 128 can include the major components that are within the foundation, but where a portion of the bars can extend from the foundation and/or be removable.

In greater detail, top portion 120 has a top loading plate 130 and a bottom loading plate 132. Top portion can further include one or more load transfer assemblies. In the embodiment shown, top portion 120 includes an upper load transfer assembly 140 and a lower transfer assembly 142. Throughout the application, reference to plates, such as plate 130 and plate 132, equally applies to an assembly structure, such as assemblies 140 and 142 without detracting from the invention of this application. Top portion further includes one or more jacks or loading sources 150, which can be any type of load source known in the art. In the embodiment shown, loading source 150 is between top loading plate 130 and bottom loading plate 132. The top portion can further include sensors that can include, but is not limited to, one or more load cells 160. Load cell 160 can include a hemispherical bearing. The upper and lower transfer assemblies can include upper and lower plates 170 with cross members 172. Top portion can further include one or more load cell plates 174 to further even out and/or spread out the forces applied thereto.

The plurality of bars 124 can include any number of bars without detracting from the invention of this application. As can be appreciated, the number of bars can be based on the size of the foundation element wherein the system includes at least one base mobilizer bar 180 and at least one shaft mobilizer bar 182. As is shown, system 100 includes three base mobilizer bars 180a-c and three shaft mobilizer bars 182a-c. System 100 further includes at least one shaft bearing plate 200 and at least one base bearing plate 210. While plates 200 and 210 are shown to have a circular configuration, these plates can include a wide range of configuration and/or construction formats without detracting from the invention of this application including multi-component plate assemblies even though they will be referred to as "plates" throughout the application. As will be discussed more below, these plates can also include shapes and/or features to allow for the filling of material into foundation opening FO, the flow of the material around and past the plates during the filling, use with structural material such as structural rebar, improve performance, monitor performance and/or to allow the use of sensors and/or movement control features. Moreover, the system can include shapes and/or features to allow for the filling of material into foundation opening FO, the flow of the material around and past the system during the filling, use with structural material such as structural rebar, improve performance, monitor performance and/or to allow the use of sensors and/or movement control features along with other foundation elements including, but not limited to, structural rebar.

Shaft mobilizer bars 182a-c are joined between top loading plate 130 and/or upper load transfer assembly 140 that is/are above source or jack 150 and shaft bearing plate 200 wherein shaft mobilizer bars 182a-c have shaft bar top ends 220a-c that are fixed relative to top loading plate 130 and/or upper load transfer assembly 140 by any means known in the art. As is shown, connectors 222 can be used to secure top ends 220a-c relative to plate 170. Connectors 222 can be any type of fastening device or system including, but not limited to, nuts, other types of threaded fasteners, locking pins, press fitted fittings, and/or welded arrangements. Shaft mobilizing bars 182a-c are also fixed relative to shaft bearing plate 200.

Again, and as can be appreciated, any method of attaching the bars relative to the plates can be used without detracting from the invention of this application wherein one such type will be discussed below in greater detail. Shaft mobilizer bars 182a-c are configured to pass through bottom loading plate 132 and/or lower transfer assembly 142 thereby allowing bars 182 to connect top loading plate 130 and/or upper load transfer assembly 140 to shaft bearing plate 200 and to allow bars 182 to move relative to bottom loading plate 132.

Base mobilizing bars 180a-c are joined between bottom loading plate 132 and/or lower transfer assembly 142 and base bearing plate 210. Again, base mobilizing bars 180a-c are operably fixed relative to these plates and can be secured thereto by any means known in the art including, but not limited to, fasteners, press fitting, threading, and/or welding. As is shown, fasteners 224 are used wherein the fasteners can be on both sides of the plate to fixably secure the plate to the rods. However, in that base mobilizing bars 180a-c are in compression, they technically do not require attachment to the plates. However, a connection between bars 180 and base bear plate 210 can be used to help lower portion 122 into the foundation opening and/or the plates can be temporarily fixed relative to one another for the lowering and positioning steps. Base mobilizing bars 180a-c are configured to pass through shaft bearing plate 200 thereby allowing bars 180a-c to connect bottom loading plate 132 to base bearing plate 210 and to move relative to shaft bearing plate 200 as is discussed above in greater detail.

Figure 13:
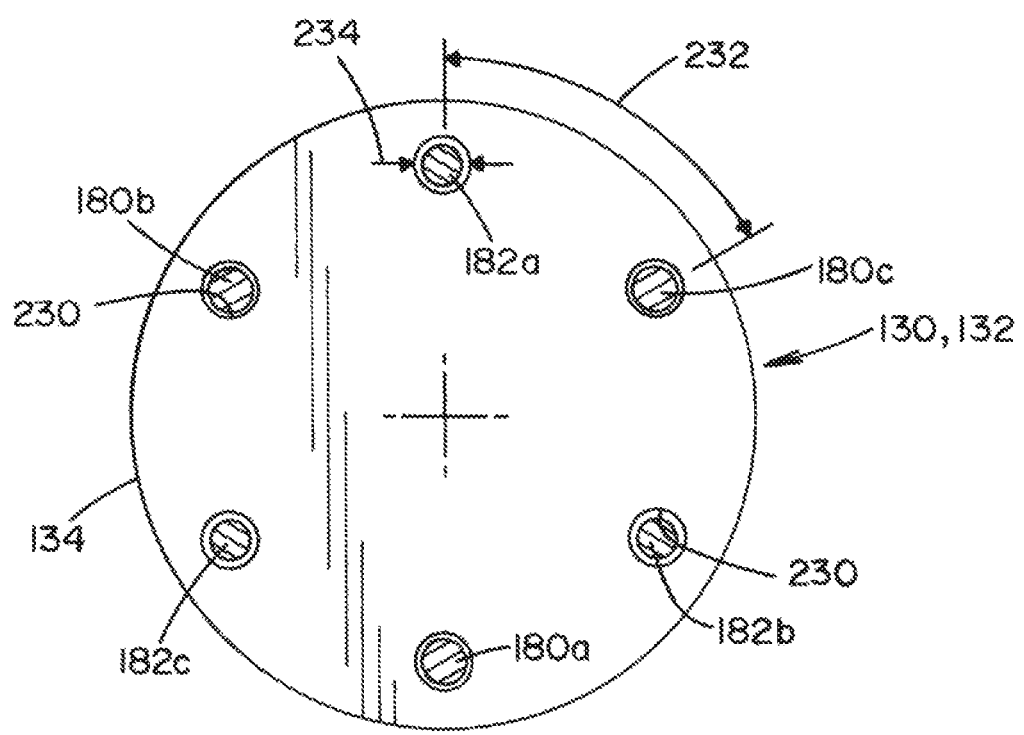
FIG. 13 is a plan view of a loading plate shown in FIG. 8.

With special reference to FIG. 13, plates 130 and 132 includes openings 230. In that system 100 is a six bar system, plates 130 and 132 can include six opening 230. In this set of embodiments openings are spaced near an outer edge 134 of plates 130 and 132. Moreover, openings 230 can have the same diameter without detracting from the invention wherein the diameter can be such that both bars 180 and 182 can pass therethrough. Fasteners, as described above and below in greater detail, can be used to fix the respective bars to the respective plates. Opening 230, in this six bar system, can be circumferentially spaced from one another at an angle 232. Angle 232 can be about 60 degrees. Opening 230 have a diameter 234 that can be 3.5 inches.

Figure 12:
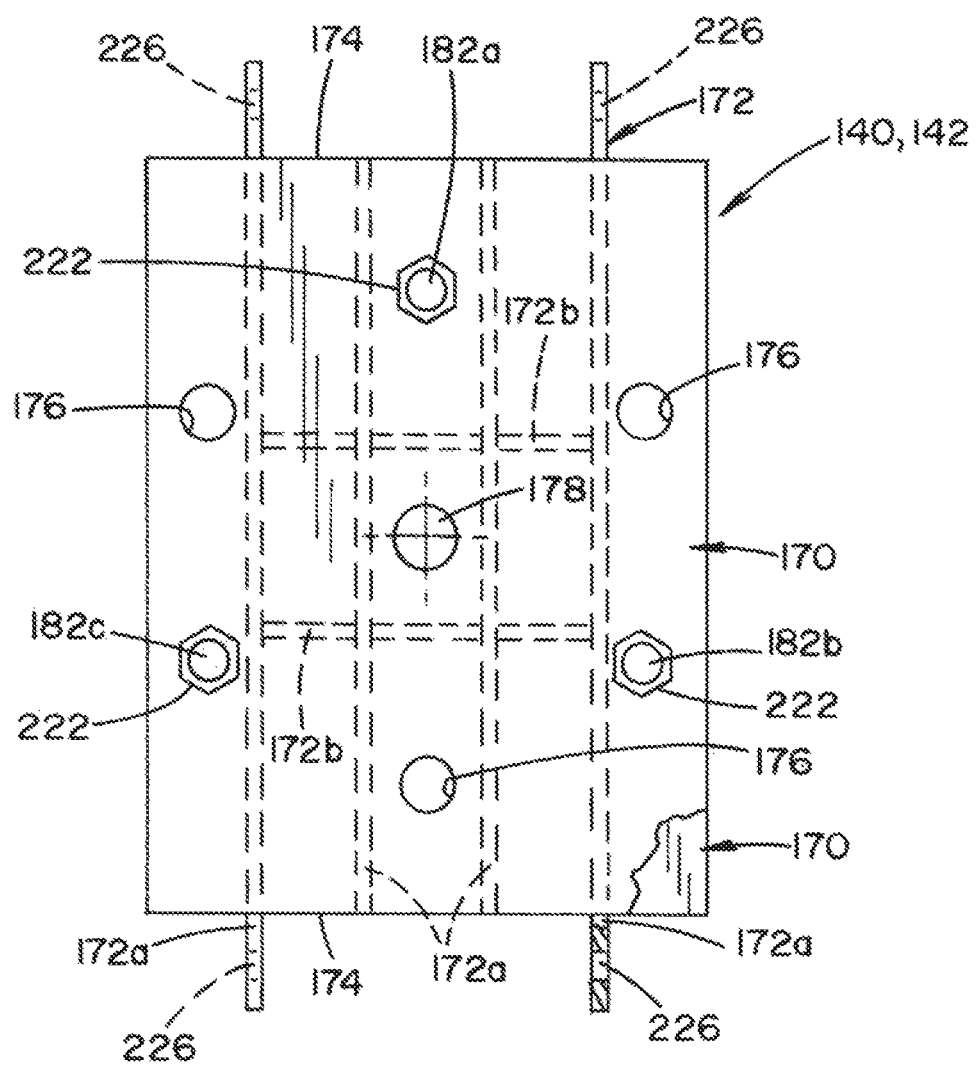
FIG. 12 is a plan view of a load transfer assembly shown in FIG. 8.

With special reference to FIG. 12, upper load transfer assembly 140 and lower transfer assembly 142 include plates 170 and can include a plurality of cross members 172. Plates 170 can have a wide range of configurations without detracting from the invention. As is shown, plate 170 has a square or rectangular configuration. Cross members 172 can utilize a wide range of support patterns without detracting from the invention of this application. As is shown, cross members 172 include members 172a that extended across at least a substantial portion of plate 170. As is shown, members 172a can extend over an edge 174 of plate 170 and they can include openings, or the like, 226 that can be used to allow assembly 120 and/or system 100 to be lifted, such as being lifted by a crane. In addition, cross members 172 can include members 172b that extend between members 172a. Plates 170 also includes openings 176 for the passage of bars 180 and 182 wherein members 172 can be spaced from these openings. Plate 170 can further include one or more openings 178 that can be used for a wide range of purposes.

Figure 10:
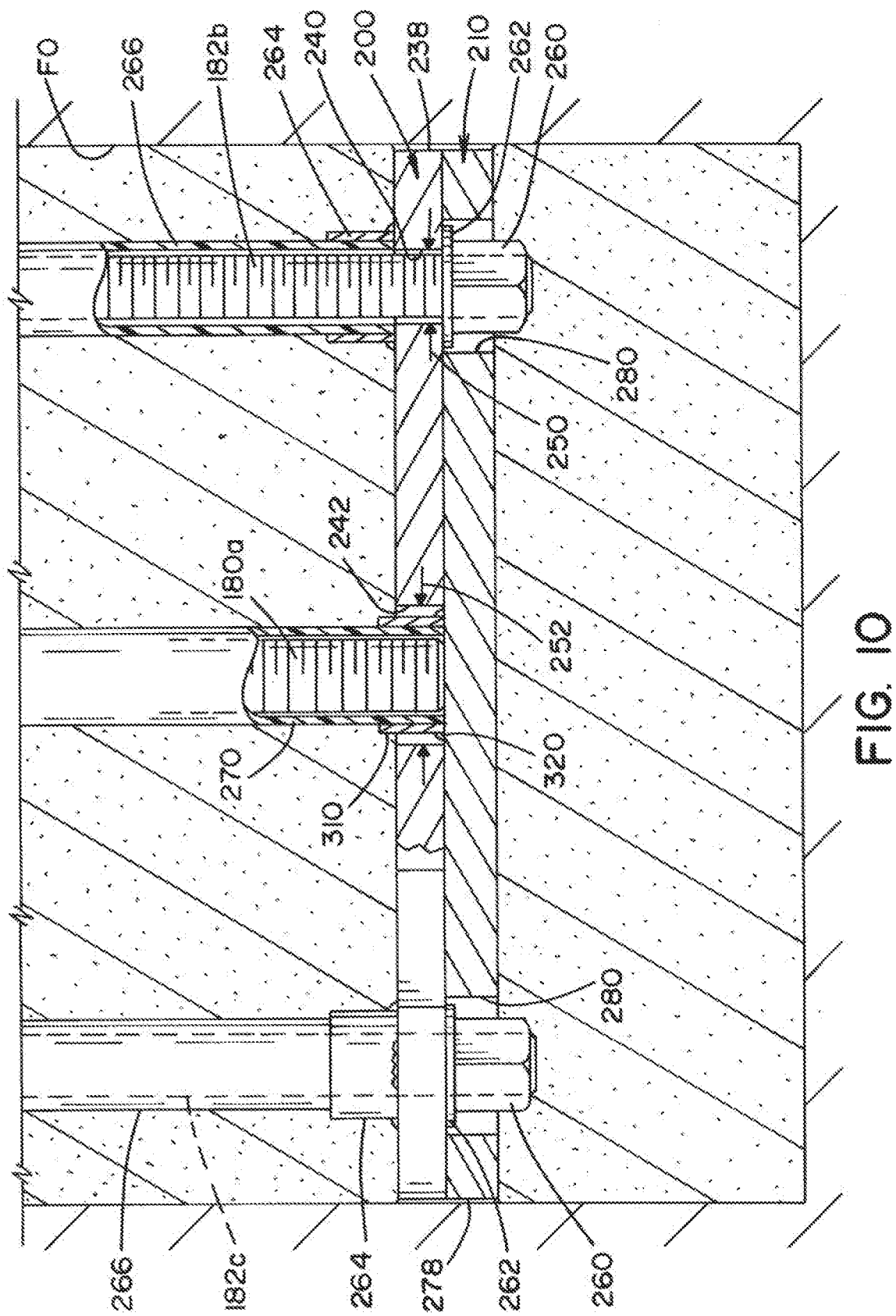
FIG. 10 is an elevational view showing a bottom portion of the testing arrangement and apparatus shown in FIG. 8 that is shown in a closed position.
Figure 11:
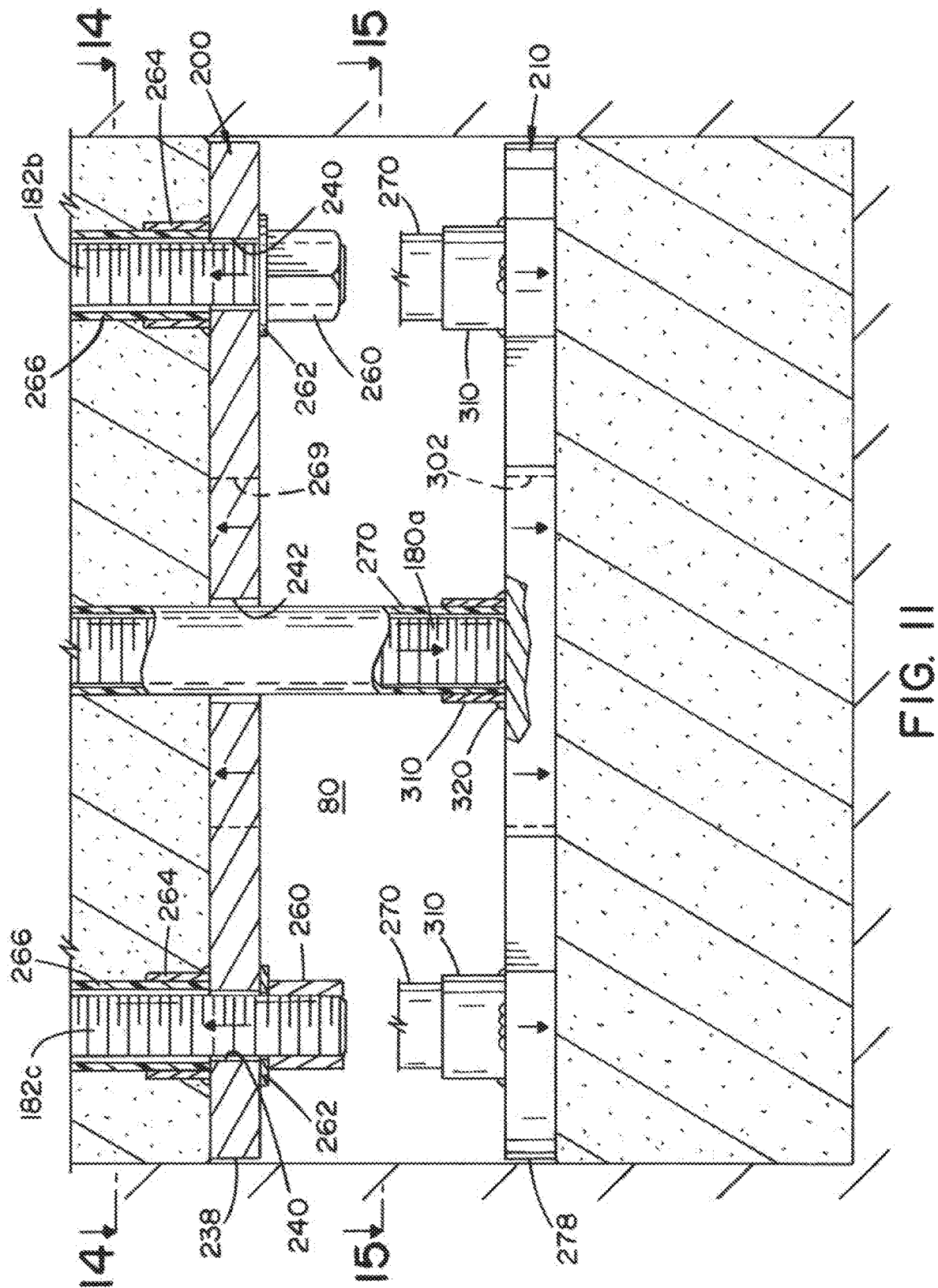
FIG. 11 is an elevational view showing the bottom portion of the testing arrangement and apparatus shown in FIG. 8 that is shown in an expanded position.
Figure 14:
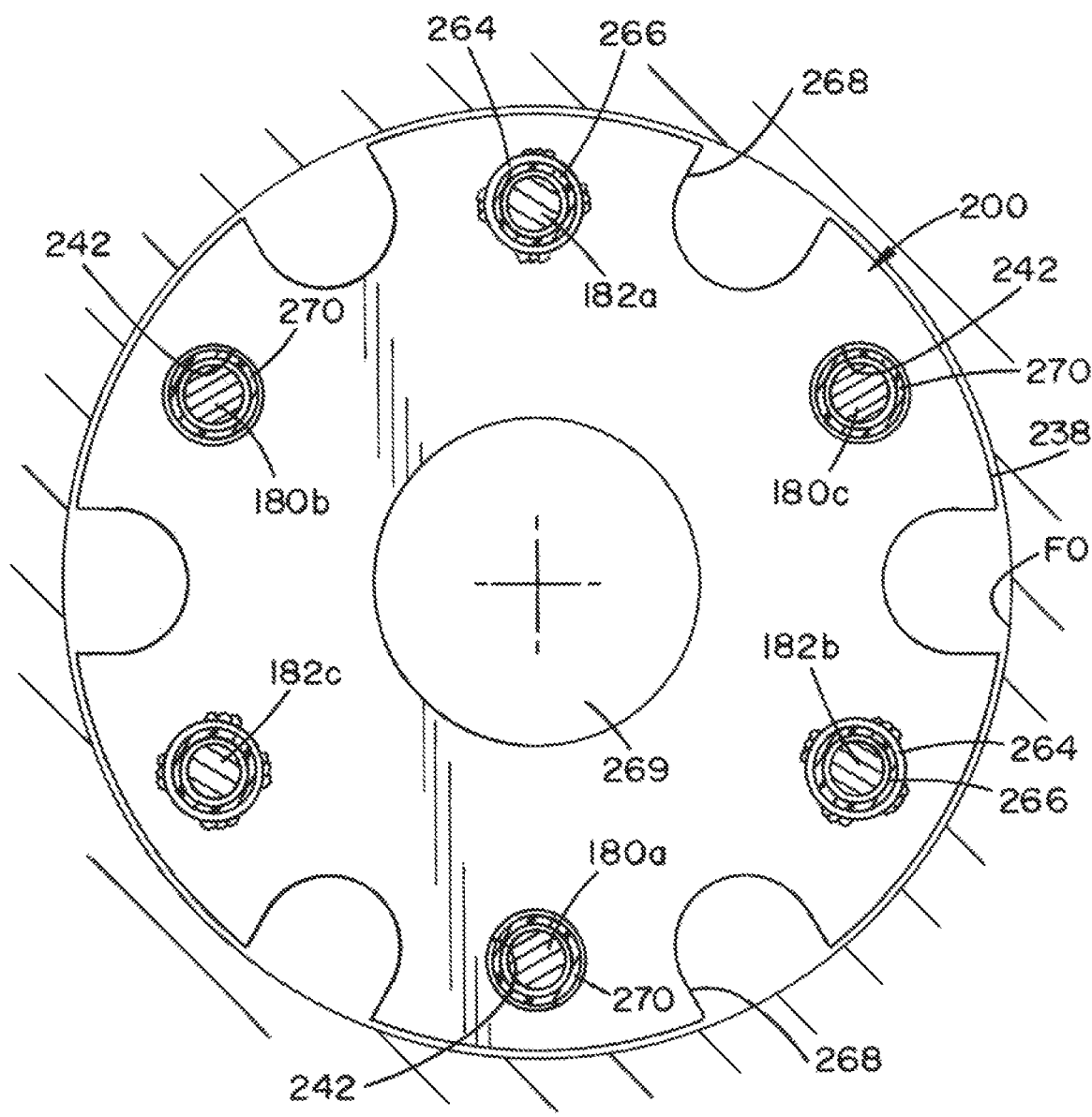
FIG. 14 is a plan view of a shaft bearing plate shown in FIG. 8.

With special reference to FIGS. 10, 11 and 14, shaft bearing plate 200 is shown. As noted above, shaft bearing plate 200 can have a circular configuration with an outer edge 238, but this is not required. In this embodiments, shaft bearing plate 200 includes openings 240 and 242 spaced inwardly from edge 238. Openings 240 have a diameter 250 and openings 242 have a diameter 252 wherein, in this embodiment, diameter 250 is smaller than diameter 252. Openings 240 are for securing bars 182 relative to plate 200 whereas bigger openings 242 are to allow bars 180 to pass through plate 200 and move relative to plate 200.

Bars 182 are joined relative to plate 200 to allow bars 182 to pull plate 200 upwardly during testing wherein plate 200 pushes against an upper portion of the foundation element. As is shown in these figures, rods or bars 182 are fixed related to plate 200 by extending through openings 240. Bars 182 can be threaded bars wherein they can be secured relative to plate 200 by hex nuts 260 positioned below plate 200, which can be fastened to the plate. One or more washers 262 can also be utilized. Bars 182 can be a Grade 75 #18 threaded bar. Nuts 260 can also be a Grade 75 #18 threaded nut. The connection between plate 200 and rods 182 can also include an upper steel pipes 264 to increase rigidity. In addition, PVC pipe material 266 can be used to seperate rods 182 from the foundation material. Moreover, shims can be positioned between steel pipes 264 and PVC pipe material 266 to strengthen the connection and/or support between the steel pipe and the rods and/or to matain the PCV pipe relative to the plate. Upper steel pipes 264 can be a 3.5 inch SCH 40 steel pipe for the increase rigidity and can help to lower the assembly into the foundation opening. As with nuts 260, pipes 264 can be secured to plate 200 by any means including, but not limited to welding the pipe to the plate. In addition, PVC pipe material 266 can be utilized to separate the bars from the foundation material. Again, plate 200 can also include other shapes and/or features to improve performance and/or to monitor performance. This can include one or more edge cut outs 268 that extend inwardly from plate edge 238, which will be discussed more below. Cut outs 268 can include a circular configuration as is shown, but this is not required and these cut outs can be equally spaced about the plate. As is shown in this embodiment, plate 200 can include six cutouts that are spaced between the bar openings wherein they can be equally spaced about the plate. Plate 200 can also include one or more central openings 269 and/or other internal openings, pockets, extensions and/or features without detracting from the invention of this application. Central opening 269 can be used to allow a tremie pipe, which is used to fill foundation opening FO with material, to pass by the plate(s). Central opening 269 and cutouts 268 also can allow the foundation material to more freely pass by and around the plate(s) to fully engulf the plate(s) in foundation opening FO with material. As will be discussed more below, openings and cutouts can be used for the attachment and/or use of sensors for any purpose including, but not limited to, monitoring the testing activities, monitor forces, monitor displacement and/or monitoring the curing of the foundation material. Moreover, they can be used to allow the system to work with other structural materials and systems such as structural rebar.

Moreover, openings 242 are sized to allow rods 180 to extend through openings 242 of plate 200. In that rods 180 are to move relative to plate 200, openings 242 are large enough to allow generally resistance free passage through the plate. As with rods 182, rods 180 can be threaded rods or bars. In the embodiment shown, rods 180 are Grade 75 #20 threaded bars. In addition, PVC pipe material 270 can be used to seperate rods 180 from the foundation material and PVC pipe 270 can also pass through opening 242.

Figure 15:
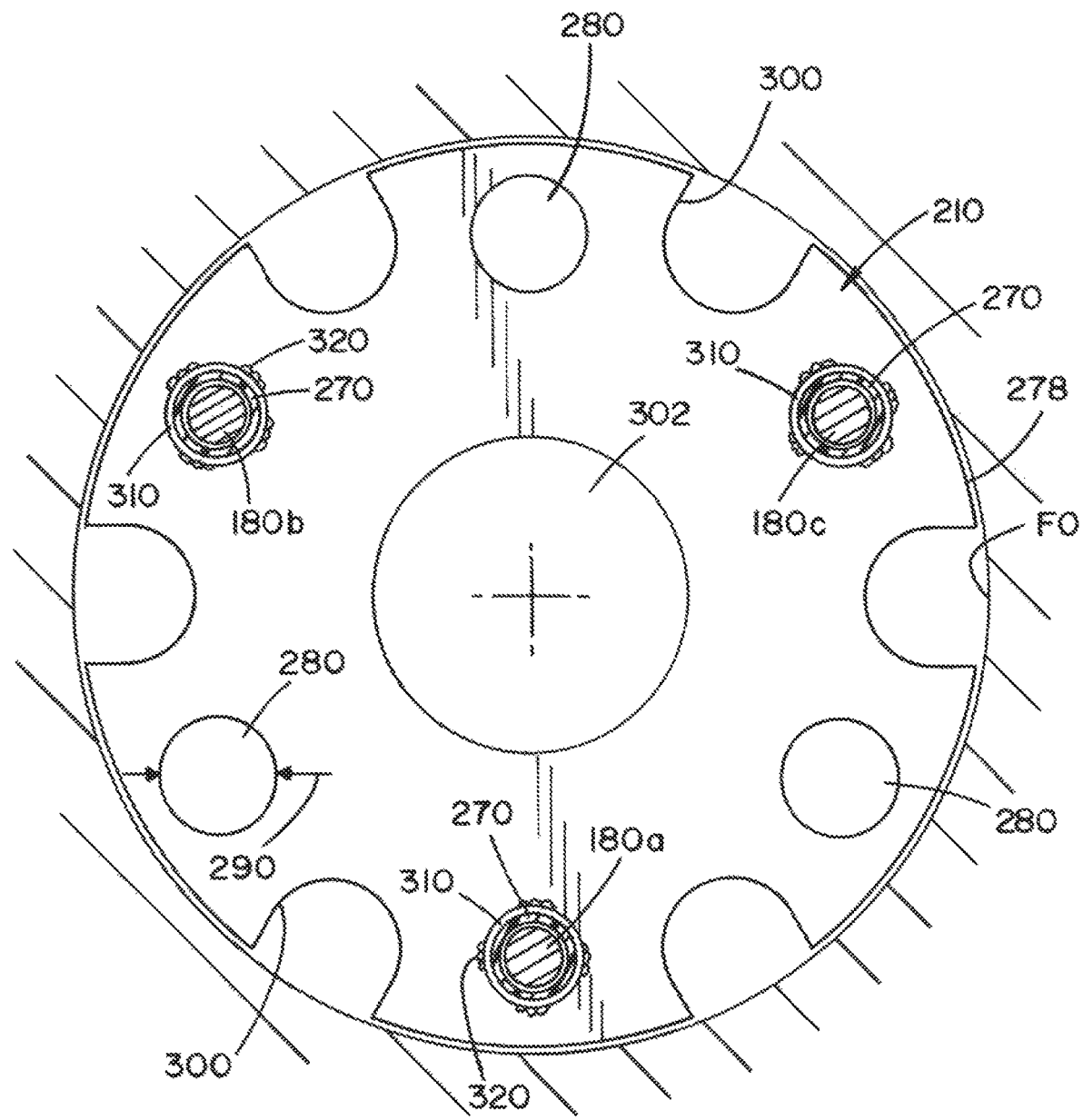
FIG. 15 is a plan view of a base bearing plate shown in FIG. 8.

With special reference to FIGS. 10, 11 and 15, base bearing plate 210 is shown. As noted above, base bearing plate 210 can have a circular configuration with an outer edge 278. In this set of embodiments, base bearing plate 210 includes openings 280. While in this set of embodiments, base bearing plate 210 only includes openings in alignment with bars 182, plate 210 can include additional openings that are in aligment with bars 180 to allow different securing techniques to secure bars 180 relative to the plate, such as those discussed above. Openings 280 have a diameter 290 wherein. opening diameter 290 of holes 280 can be sized to allow bars 182, hex nut 260 and/or washer 262 to pass through plate 210 and move relative to plate 210; especially when the system is in the closed condition as is shown in FIG. 10 wherein the plates can be sandwhiched together. Again, plate 210 can also include other shapes and/or features to improve performance and/or to monitor performance. This can include one or more edge cut outs 300. Cut outs 300 can include a circular configuration as is shown, but this is not required, and these cut outs can be equally spaced about the plate. As is shown in this embodiment, plate 210 can include six cutouts that are spaced between the bars. The plate can further include a central opening 302 and/or other internal openings, pockets, extensions and/or features without detracting from the invention of this application. Again, central opening 302 can be used to allow a tremie pipe to pass plate 210 when filing foundation opening FO with material. Moreover, central opening 302 and cutouts 300 also can allow the foundation material to more freely pass by and around the plate(s) to fully engulf the plate(s) in the borehole. As will be discussed more below, these also can be used for the attachments of sensors for any purpose including, but not limited to, monitoring the testing activities, monitor forces, monitor displacement and/or monitoring the curing of the foundation material. Moreover, they can be used to allow the system to work in connection with structural rebar, which also will be discussed more below. Yet even further, plates can be sized and positioned such that edges 238 and 278 are at least near side wall(s) SW such that plates 200 and 210 push against a substantial portion of the foundation element(s), which balances the forces applied thereto. Moreover, this allows movement of the plates without having to first fracture a substantial portion of the foundation element. This forms a first foundation element and a second foundation element on either sides of plates 200 and 210.

Bars 180 are joined, held relative to and/or rest against plate 210 to allow the plate to be lowered into the borehole and to allow bars 180 to push plate 210 downwardly during testing. As is shown, rods or bars 180 engage plate 210 to allow them to push the plate downwardly in the foundation opening. This can include bars 180 being fixed to the plate and/or resting against the plate wherein gravity maintains the bar in an operating position until the test is performed. This also can include a pocket (not shown) in plate 210, a threaded opening in the plate and/or a threaded fastener joined to the plate as is referenced above. As is shown, plate 210 can include pipes 310 wherein bars 180 can extend into pipes 310. Pipes 310 can be fixed relative to plate 210 by any means known in the art including, but not limited to, welding the pipes to the plate at one or more weld joints 320. Moreover, pipes 310 and/or bars 182 could be threaded into a plate opening (not shown) and/or a nut below the plate (also not shown). Again, Rods or bars 180 also can be threaded bar wherein they can be secured relative to plate 210 by threaded engagement with pipes 310. Again, PVC pipe material 270 can be used to seperate rods 180 from the foundation material. In order to lower plate 210 into the borehole, bars 182 can be utilized to hold the plate(s). In that the lowering process only requires the support of the weight of plate 210 to prevent it from falling from the assembled structure, this connection can be temporary and/or of limited strength. Then, during testing, bars 182 push against plate 210 wherein a strong connection therebetween is not needed for most testing. However, if an additional pull test is desired for plate 210, a more secure attachment between plate 210 and bars 182 can be created and this can include a threaded connection therebetween referenced above. In one set of embodiments, bars 182 can be secured relateive to plate 210 by fixing shims between bars 182 and pipes 310. Yet even further, plate 210 can be secured for lowering the system into the borehole by affixing plate 210 relative to plate 200. This can include, but is not limited to, an adhesive connection between the plates or the like. Then, this affixed connection would be easily broken when the test load are applied to the system.

Figure 16:
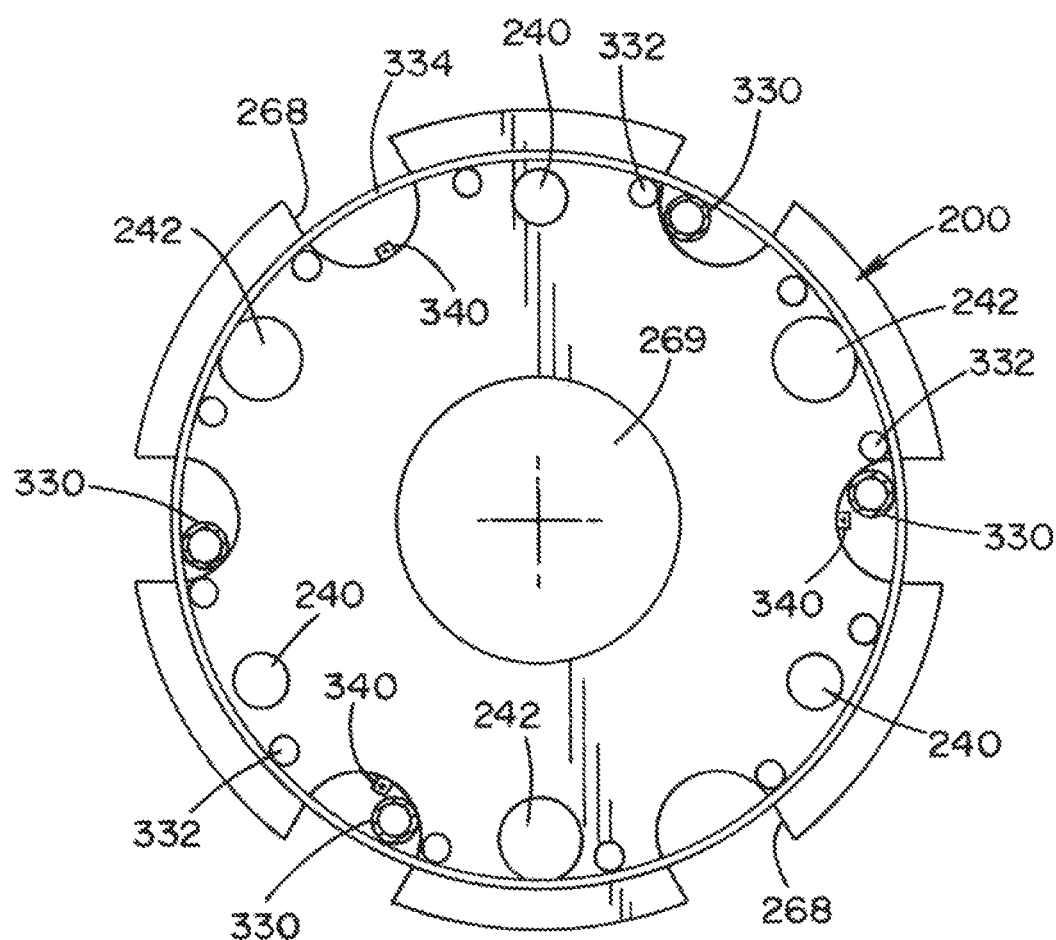
FIG. 16 is a plan view of the shaft bearing plate shown in FIG. 8 that shows yet further embodiments; and, FIG. 17 is a plan view of a base bearing plate shown in FIG. 8 that shows yet further embodiments.
Figure 17:
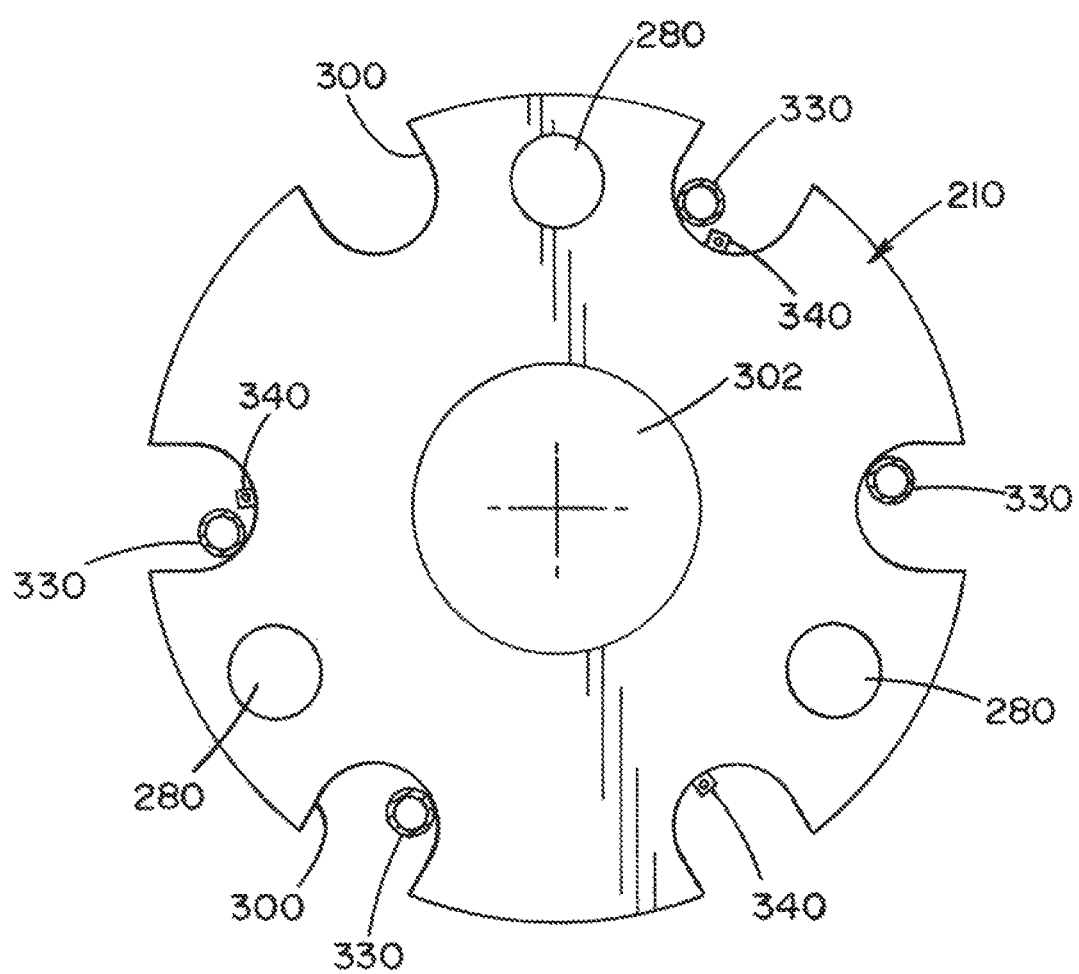

Again, the systems of this application can include a wide range of sensing devices wherein many of these are incorporated by reference into this application. With special reference to FIGS. 16 and 17, shown are some of these additional features. In this respect, the systems can include one or more steel pipes 330 that align with cut outs 268 and 300 of plates 200 and 210, respectively and can be used for access to the testing zone at or near plates 200 and 210. As is shown, there are four pipes 330 in this set of embodiments. In addition, the systems can include the use of additional rebar 332 and an outer reinforcement spiral or helical 334. The systems can further include one or more displacement measuring devices to measure displacements corresponding to the shaft bearing plate and the base bearing plate during the test. This can include, but is not limited to telltale measuring systems 340 to measure the displacement of the plates.

The methods and steps discussed above with reference to System R also apply to system 100 wherein they are not repeated in the interest of brevity.

Further Invention Statements

1. Base bearing plate(s) 9, 210 can be used without instrumentation or instrumented with specialized wired or wireless monitoring instrumentation to measure strain within the base bearing plate(s) 9. 210.
2. Shaft bearing plate(s) 8, 200 can be used without instrumentation or instrumented with specialized wired or wireless electronic or mechanical instrumentation to measure strain within the shaft bearing plate(s) 8, 200.
3. The shaft mobilizer bar(s) 1, 182 can be solid bars or flexible steel cables connected to the shaft bearing plate(s) 8, 200 by any means of connection or passed through or underneath the plate in a U-shape arrangement.
4. The interface between the shaft bearing plate(s) 8, 200 and/or the base bearing plate(s) 9, 210 can be instrumented with specialized wired or wireless electronic or mechanical displacement monitoring device(s) to monitor the separation between the shaft bearing plate(s) 8, 200 and the base bearing plate(s) 9, 210.
5. The separation between the shaft bearing plate(s) 8, 200 and/or the base bearing plate(s) 9, 210 can be monitored with the use of telltales 340 installed on the shaft bearing plate(s) 8, 200 and/or the base bearing plate(s) 9, 210.
6. The separation between the shaft bearing plate(s) 8, 200 and the base bearing plate(s) 9, 210 can be monitored through wired or wireless electronic or mechanical displacement monitoring instrumentation installed on shaft mobilizer bar(s) 1, 182 and/or base mobilizer bar(s) 6, 180 at the surface.

7. Loads transferred to the shaft bearing plate(s) 8, 200 by the means of the shaft mobilizer bar(s) 1, 182 can be monitored using load cells 160 and/or one or more load cells located between the shaft bearing plate(s) 8, 200 and the shaft mobilizer bar(s) 1, 182.
8. Loads transferred to the shaft bearing plate(s) 8, 200 by the means of the shaft mobilizer bar(s) 1, 182 can be monitored using strain gages 342 located along the shaft mobilizer bar(s) 1, 182 and/or nearby the shaft bearing plate(s) 8, 200.
9. Loads transferred to the base bearing plate(s) 9, 210 by the means of the base mobilizer bar(s) 6, 180 can be monitored using load cells located between the base bearing plate(s) 9, 210 and the base mobilizer bar(s) 6, 180.
10. Loads transferred to the base bearing plate(s) 9, 210 by the means of the base mobilizer bar(s) 6, 180 can be monitored using strain gages 342 located along the base mobilizer bar(s) 6, 180 and/or nearby the base bearing plate(s) 9, 210.
11. Loads and/or displacements can be monitored automatically and/or manually. Furthermore, loads can be automatically regulated according to a prescribed protocol using feedback control technology.
12. The connection between shaft mobilizer bar(s) 1, 182 and/or the shaft bearing plate(s) 8, 200, can be threaded, welded and/or push-in connection and/or other means known in the art.
13. The connection between base mobilizer bar(s) 6, 180 and the base bearing plate(s) 9, 210, can be threaded, welded or push-in connection and/or other means known in the art. Moreover, a secured connection between base mobilizer bar(s) 6, 180 and the base bearing plate(s) 9, 210 is not required in that the bars can merely rest against the plate.
14. The connection between base mobilizer bar(s) 6, 180 and the base bearing plate(s) 9, 210, can be a right-hand thread system.
15. The connection between shaft mobilizer bar(s) 1, 182 and the shaft bearing plate(s) 8,200, can be a right-hand thread system.
16. The loads applied during the load testing can be applied manually and/or through an Automated Load Testing monitoring and load application system.
17. The loading source can be a single loading device mounted individually on each shaft mobilizer bar 1, 182, and/or each base mobilizer bar 6, 180.
18. The shaft mobilizer bar(s) 1, 182 and/or the base mobilizer bar(s) 6, 180 can be combined into a concentric system where base mobilizer bar(s) 6, 180 is installed inside the shaft mobilizer bar(s) 1, 182 and/or further installed inside a sacrificial tube. One or more concentric system can be used to perform the testing description of this invention.
19. To avoid collapse of the soils between plates 8, 200 & 9, 210 in void 80, the systems can include optional automatic pressure injection of a fluid to be solidified and/or become part of the foundation element to properly maintain the continuous load transfer.
20. To avoid soil intrusion between plates 8, 200 & 9, 210 in void 80 during testing, the application related to this invention can include an optional, expandable sleeve or diaphragm in void 80 between shaft bearing plate(s) 8, 200 and base bearing plate(s) 9, 210.
21. To assess potential deformation of plates 8, 200, 9, 210, optional tilt measurements can be made atop plates 8 and 200 and below plates 9 and 210.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A testing system for load test measuring a shaft resistance and a base resistance of a foundation element without embedding a jack assembly within the foundation element, the foundation element extending in a foundation opening wherein the foundation opening includes one or more sidewalls and a bottom surface, the at least one foundation element having a top extent and a bottom extent; the testing system comprising:
   at least one loading sources positioned above an associated top extent of an associated foundation element wherein the associated foundation element extends into an associated foundation opening that includes at least one associated sidewall and an associated bottom surface;
   a first operating unit including at least one bottom loading plate positioned below the loading source, at least one base bearing plate facing the associated bottom surface of the associated foundation opening and at least one base mobilizer bar; the at least one base mobilizer bar operably joining the at least one bottom loading plate and the at least one base bearing plate wherein movement of the at least one bottom loading plate results in movement of the first operating unit as a whole;
   a second operating unit including at least one top loading plate positioned above the loading source, at least one shaft bearing plate that is positioned above the at least one base bearing plate within the associated foundation opening and at least one shaft mobilizer bar operably joining the at least one top loading plate and the at least one shaft bearing plate wherein movement of the at least one top loading plate results in movement of the second operating unit as a whole;
   the at least one bottom loading plate having a bottom loading plate shape allowing the at least one shaft mobilizer bar to extend past the at least one bottom loading plate and move relative to the at least one bottom loading plate and the at least one shaft bearing plate having a shaft bearing plate shape allowing the at least one base mobilizer bar to extend past the least one shaft bearing plate and move relative to the at least one shaft bearing plate wherein the first and second operating units can move relative to one another;
   the at least one shaft bearing plate being positioned below the associated foundation element and the at least one base bearing plate being positioned between the at least one shaft bearing plate and the associated bottom surface of the associated foundation opening wherein a test load produced by the at least one loading sources urges the at least one top loading plate away from the at least one bottom loading plate thereby producing an upward force against the associated foundation element and a downward force toward the associated bottom surface.

2. The testing system according to claim 1, wherein the associated foundation element is a first associated foundation element and there being a second associated foundation element, the second associated foundation element extending between the at least one base bearing plate and the associated bottom surface of the associated foundation opening, the at least one shaft bearing plate and the at least one base bearing plate being between the first and second associated foundation elements.

3. The testing system according to claim 2, wherein there is a plate void between the at least one shaft bearing plate and the at least one base bearing plate, the system further including a fluid flow path between the associated top extent of the associated foundation element and the plate void to allow an associated foundation material to be pumped into the plate void to form a third associated foundation element.

4. The testing system according to claim 3, wherein the at least one shaft bearing plate is a single unified plate that forms a separation between the associated first associated foundation element from the plate void.

5. The testing system according to claim 3, wherein the system further includes a tube extending from at least one of the at least one shaft bearing plate and the at least one base bearing plate to the associated top extent of the associated foundation, the tube forming the fluid flow path.

6. The testing system according to claim 1, wherein the system further includes sacrificial tubes extending from the at least one shaft bearing plate to the associated top extent of the associated foundation, the at least one shaft mobilizer bar each extending through one of the sacrificial tubes.

7. The testing system according to claim 6, wherein the at least one shaft mobilizer bar are selectively attachable and detachable from the at least one shaft bearing plate, the at least one shaft bearing plate being spaced from the at least one base bearing plate forming a plate void therebetween, the sacrificial tubes forming a fluid flow path to allow an associated foundation material to be pumped into the plate void.

8. The testing system according to claim 1, wherein the system further includes sacrificial tubes extending through the foundation element and to the associated top extent of the associated foundation, the at least one base mobilizer bar each extending through one of the sacrificial tubes.

9. The testing system according to claim 8, wherein the at least one base mobilizer bar are selectively attachable and detachable from the at least one base bearing plate, the at least one base bearing plate being spaced from the at least one shaft bearing plate forming a plate void therebetween, the sacrificial tubes forming a fluid flow path to allow an associated foundation material to be pumped into the plate void.

10. The testing system according to claim 1, wherein the at least one shaft bearing plate is a single unified shaft bearing plate and the at least one base bearing plate is a single unified base bearing plate.

11. The testing system according to claim 10, wherein the single unified shaft bearing plate has a circular configuration and has a plate diameter similar to an associate foundation opening diameter.

12. The testing system according to claim 1, wherein at least one of the bottom loading plate shape includes at least one opening and each of the at least one shaft mobilizer bar extending through one of the at least one opening, and the shaft bearing plate shape includes at least one opening and each of the at least one base mobilizer bar extending through one of the at least one opening.

13. The testing system according to claim 1, wherein the shaft bearing plate shape includes at least one edge cutout and a central opening and the base bearing plate shape includes at least one edge cutout and a central opening, the at least one edge cutouts and the central openings allowing the associated material foundation material to move past and around the plates to engulf the plates in the foundation material.

14. The testing system according to claim 13, wherein the associated foundation element is a first associated foundation element and there being a second foundation element, the second foundation element being between the at least one base bearing plate and the associated bottom surface of the associated foundation opening and being at least one of separate and separable from the associated first foundation element, the at least one shaft bearing plate and the at least one base bearing plate being between the first and second associated foundation elements.

15. The testing system according to claim 14, wherein there is a plate void between the at least one shaft bearing plate and the at least one base bearing plate, the system further including a fluid flow path between the associated top extent of the associated foundation and the plate void to allow an associated foundation material to be pumped into the plate void to form a third associated foundation element between the first and second foundation elements.

16. The testing system according to claim 15, wherein the system further includes sacrificial tubes extending from at least one of the at least one shaft bearing plate and the at least one base bearing plate to the associated top extent of the associated foundation, the sacrificial tube forming the fluid flow path.

17. The testing system according to claim 16, wherein the at least one shaft bearing plate is a single unified plate that forms a separation between the associated first associated foundation element from the plate void.

18. The testing system according to claim 1, wherein the at least one base mobilizer bar includes a plurality of base mobilizer bars and/or the at least one shaft mobilizer bar includes a plurality of shaft mobilizer bars.

19. A method of load test measuring a shaft resistance and a base resistance of a foundation element without embedding a jack assembly within the foundation element, the foundation element extending in a foundation opening wherein the foundation opening includes one or more sidewalls and a bottom surface, the at least one foundation element having a top extent and a bottom extent; the method comprising the steps of:
providing a first operating unit that includes at least one base bearing plate and at least one base mobilizer bar fixed relative to the at least one base bearing plate;
providing a second operating unit that includes at least one shaft bearing plate and at least one shaft mobilizer bar fixed relative to the at least one shaft bearing plate;
lowering the first and second operating units into the foundation opening;
filling the foundation opening with a foundation material;
allowing the foundational material to cure to form at least one foundation element;
securing at least one bottom loading plate relative to the at least one base mobilizer bar wherein the at least one base mobilizer bar join the at least one bottom loading plate and the at least one base bearing plate wherein movement of the at least one bottom loading plate results in movement of the first operating unit as a whole;
securing at least one top loading plate relative to the at least one shaft mobilizer bar wherein the at least one shaft mobilizer bar join the at least one top loading plate and the at least one shaft bearing plate wherein movement of the at least one top loading plate results in movement of the second operating unit as a whole;

providing at least one loading sources positioned between the at least one top loading plate and the at least one bottom loading plate and above the top extent of the foundation opening;

applying a test load with the at least one loading sources to urge the at least one top loading plate away from the at least one bottom loading plate thereby producing an upward force against the foundation element and a downward force on the associated bottom surface.

20. The method according to claim 19, further including the steps of measuring at least one of the test load and the movement of the foundation element.

21. The method according to claim 19, wherein a plate void is formed after the applying step between the at least one shaft bearing plate and the at least one base bearing plate, at least one of the first and second operating units including one or more sacrificial tubes and the sacrificial tubes forming a fluid flow path between the top extent of the foundation element and the plate void, the method further including the step of filing the plate void with foundation material after the applying step.

22. The method according to claim 19, wherein the first and second operating units are lowered into the foundation opening together.

23. The method according to claim 22, wherein the at least one base bearing plate is temporality secured relative to the at least one shaft bearing plate for the lowering step.

24. A method of load test measuring a shaft resistance and a base resistance of a foundation element without embedding a jack assembly within the foundation element, the foundation element extending in a foundation opening wherein the foundation opening includes one or more sidewalls and a bottom surface, the at least one foundation element having a top extent and a bottom extent; the method comprising the steps of:

providing a first operating unit that includes at least one base bearing plate and at least one base sacrificial tube fixed relative to the at least one base bearing plate;

providing a second operating unit includes at least one shaft bearing plate and at least one shaft sacrificial tube fixed relative to the at least one shaft bearing plate;

lowering the first and second operating units into the foundation opening;

filling the foundation opening with a foundation material;

allowing the foundational material to cure to form a foundation element;

extending a base mobilizer bar through each of the at least one base sacrificial tube wherein the base mobilizer bar is operably joined to the at least one base bearing plate and extending a shaft mobilizer bar through each of the at least one shaft sacrificial tube and operably positioning the shaft mobilizer bar relative to the at least one shaft bearing plate securing at least one bottom loading plate relative to the base mobilizer bar wherein the base mobilizer bar joins the at least one bottom loading plate and the at least one base bearing plate wherein movement of the at least one bottom loading plate results in movement of the first operating unit;

securing at least one top loading plate relative to the shaft mobilizer bar wherein the shaft mobilizer bar joins the at least one top loading plate and the at least one shaft bearing plate wherein movement of the at least one top loading plate results in movement of the second operating unit;

providing at least one loading source positioned between the at least one top loading plate and the at least one bottom loading plate and above the top extent of the foundation opening;

applying a test load with the at least one loading sources to urge the at least one top loading plate away from the at least one bottom loading plate thereby producing an upward force against the foundation element and a downward force on the associated bottom surface.

25. The method according to claim 24, further including the step of removing at least one of the base mobilizer bar and the shaft mobilizer bar to form a fluid flow path between the top extent of the foundation element and a plate void between the at least one base bearing plate at least one shaft bearing plate, and filing the plate void with foundation material after the applying step.

26. The method according to claim 19, wherein the filling of the foundation opening is a second filling step and the method further including a first filling step of filling the foundation opening with a first portion of foundation material and a first curing step before the lowering step for the first and second operating units that are lowered into the foundation opening; the second filling step filling the foundation opening above the at least one shaft bearing plate.

* * * * *